United States Patent
Marcinkiewicz

(10) Patent No.: US 6,731,083 B2
(45) Date of Patent: May 4, 2004

(54) FLUX FEEDBACK CONTROL SYSTEM

(75) Inventor: Joseph Gerald Marcinkiewicz, St. Charles, MO (US)

(73) Assignee: Switched Reluctance Drives, Ltd., Harrogate (GB)

( * ) Notice: Subject to any disclaimer, the term of this patent is extended or adjusted under 35 U.S.C. 154(b) by 0 days.

(21) Appl. No.: 10/128,715

(22) Filed: Apr. 22, 2002

(65) Prior Publication Data

US 2002/0149331 A1 Oct. 17, 2002

Related U.S. Application Data

(63) Continuation-in-part of application No. 09/845,673, filed on Apr. 30, 2001, now Pat. No. 6,404,154, and a continuation-in-part of application No. 09/738,467, filed on Dec. 15, 2000, which is a continuation-in-part of application No. 09/513,906, filed on Feb. 25, 2000, now Pat. No. 6,225,767, which is a continuation of application No. 09/088,922, filed on Jun. 2, 1998, now Pat. No. 6,091,215.

(51) Int. Cl.[7] .................. H02K 33/00; H02K 7/09
(52) U.S. Cl. ............... 318/254; 318/135; 318/128
(58) Field of Search ................... 318/254, 700, 318/702, 727, 127, 128, 439, 135, 701, 121, 126, 129, 245, 110; 310/15, 112, 90.5; 219/108, 110

(56) References Cited

U.S. PATENT DOCUMENTS

| | | | |
|---|---|---|---|
| 3,750,927 A | | 8/1973 | Miller et al. |
| 3,840,979 A | | 10/1974 | Miller et al. |
| 3,920,504 A | | 11/1975 | Shoh et al. |
| 4,093,917 A | | 6/1978 | Haeussermann |
| 4,107,591 A | * | 8/1978 | Herr et al. .................. 318/663 |
| 4,274,040 A | | 6/1981 | Spiegel |

(List continued on next page.)

FOREIGN PATENT DOCUMENTS

| | | | |
|---|---|---|---|
| DE | 41 08 688 | 3/1991 | |
| DE | 195 44 207 | 11/1995 | |
| EP | 0 532 350 | 3/1993 | |
| EP | 0 573 198 | 12/1993 | |
| JP | 02184904 A | * 7/1990 | ............ G05D/1/02 |
| WO | 99/62666 | 12/1999 | |

OTHER PUBLICATIONS

Patent Abstracts of Japan, vol. 004, No. 157 (E–032), Aug. 14, 1980, Abstract of JP 55 106056.
Patent Abstracts of Japan, vol. 005, No. 007 (E–041), Oct. 25, 1980, Abstract of JP 55 136890 A.
Fratta, Antonio et al., "A Reluctance Motor Drive for High Dynamic Performance Applications", IEEE Transactions on Industry Applications, vol. 28, No. 4, Jul./Aug. 1992.

(List continued on next page.)

*Primary Examiner*—Robert Nappi
*Assistant Examiner*—Eduardo Colon Santana
(74) *Attorney, Agent, or Firm*—Dicke, Billig & Czaja, PLLC

(57) ABSTRACT

An electrical machine includes a rotor, a stator operably coupled with the rotor, at least one phase winding operably coupled with the rotor and stator and arranged to establish flux in a magnetic circuit in the machine, and a flux observer adapted to produce a signal indicative of flux-causing voltage across the at least one phase winding. A flux control system includes a flux controller adapted to receive a flux command as an input and to provide a phase coil energization signal as an output. The system also includes an electromagnetic system adapted to receive the phase coil energization signal, the electromagnetic system including at least one phase coil, and a flux observer adapted to provide a feedback signal to the flux controller. The feedback signal corresponds to flux in the electromagnetic system, and the phase coil energization signal provided by the flux controller energizes the electromagnetic system such that flux in the electromagnetic system follows the flux command.

17 Claims, 12 Drawing Sheets

U.S. PATENT DOCUMENTS

| | | | |
|---|---|---|---|
| 4,571,479 A | * | 2/1986 | Maeda et al. ............... 318/576 |
| 4,598,351 A | | 7/1986 | Fair et al. |
| 4,634,191 A | | 1/1987 | Studer |
| 4,642,501 A | | 2/1987 | Kral et al. |
| 4,656,400 A | | 4/1987 | Pailthorp et al. |
| 4,659,969 A | | 4/1987 | Stupak, Jr. |
| 4,665,348 A | | 5/1987 | Stupak, Jr. et al. |
| 4,713,590 A | | 12/1987 | Ohno |
| 4,715,523 A | * | 12/1987 | Lebedev et al. ............ 318/115 |
| 4,862,014 A | | 8/1989 | Myers et al. |
| 4,896,089 A | | 1/1990 | Kliman et al. |
| 5,003,211 A | | 3/1991 | Groom |
| 5,126,641 A | | 6/1992 | Putman et al. |
| 5,140,243 A | | 8/1992 | Lyons et al. |
| 5,160,393 A | | 11/1992 | Snyder |
| 5,220,492 A | | 6/1993 | Rubin et al. |
| 5,277,744 A | | 1/1994 | Snyder |
| 5,300,841 A | | 4/1994 | Preston et al. |
| 5,378,951 A | | 1/1995 | Snyder |
| 5,379,864 A | | 1/1995 | Colby |
| 5,467,025 A | * | 11/1995 | Ray ........................... 318/701 |
| 5,471,106 A | | 11/1995 | Curtis et al. |
| 5,532,564 A | * | 7/1996 | Zorzolo ...................... 318/254 |
| 5,562,242 A | | 10/1996 | Manzo et al. |
| 5,696,430 A | | 12/1997 | Erdman et al. |
| 5,795,419 A | | 8/1998 | Lotz et al. |
| 5,841,262 A | * | 11/1998 | Tang ........................... 318/701 |
| 5,844,193 A | | 12/1998 | Nomura et al. |
| 5,844,341 A | | 12/1998 | Spooner et al. |
| 5,905,366 A | * | 5/1999 | Wilson ........................ 318/701 |
| 6,051,904 A | * | 4/2000 | Akemakou ................. 318/701 |
| 6,091,215 A | | 7/2000 | Lovett et al. |
| 6,094,364 A | * | 7/2000 | Heikkila ..................... 318/807 |
| 6,166,501 A | * | 12/2000 | Furuki et al. ............... 318/254 |
| 6,208,497 B1 | | 3/2001 | Seale et al. |
| 6,225,767 B1 | | 5/2001 | Lovett et al. |
| 6,509,711 B1 | * | 1/2003 | Zaremba ..................... 318/800 |
| 2002/0017883 A1 | | 2/2002 | Marcinkiewicz et al. |

OTHER PUBLICATIONS

Vagati, Alfredo et al., "High–Performance Control of Synchronous Reluctance Motors", IEEE Transactions on Industry Applications, vol. 33, No. 4, Jul./Aug. 1997.

Takayama, K., et al., "A New Type Switched Reluctance Motor," IEEE, XP010519068, 1988.

Weiner, C., et al., "Flux–Linkage Control of Fully–Pitched Switched Reluctance Motors," EPE , vol. CONF. 8, 1999.

Stephenson, Dr. J.M., et al., "The Characteristics, Design and Applications of Switched Reluctance Motors and Drives," PCIM '93, Conference and Exhibition, Seminar 5, 1993, Nürnberg, Germany, pp. 1–68.

Barrass, Dr. P.G., et al., "Torque Control of Switched Reluctance Drives," ICEM '96 Proceedings, International Conference on Electrical Machines, 1996, Vigo, Spain, vol. 1, pp. 254–259.

Mir, Sayeed, et al., "Switched Reluctance Motor Modeling with On–Line Parameter Identification," IEEE Industry Applications Society Annual Meeting, Louisiana, U.S.A., 1997, pp. 333–340.

Weiner, C., et al., "Flux–Linkage Control of Fully–Pitched Switched Reluctance Motors," EPE '99, 8$^{th}$ European Conference on Power Electronics and Applications, 1999, Lausanne, Switzerland, pp. 1–9.

* cited by examiner

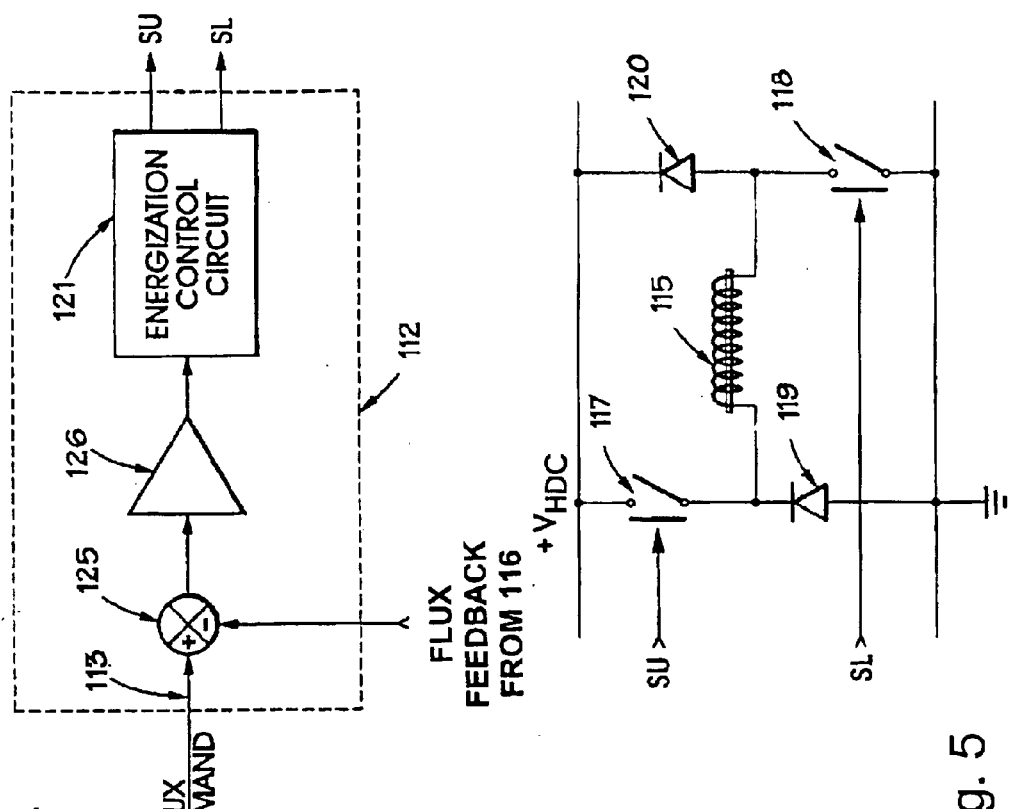
Fig. 4
Fig. 5
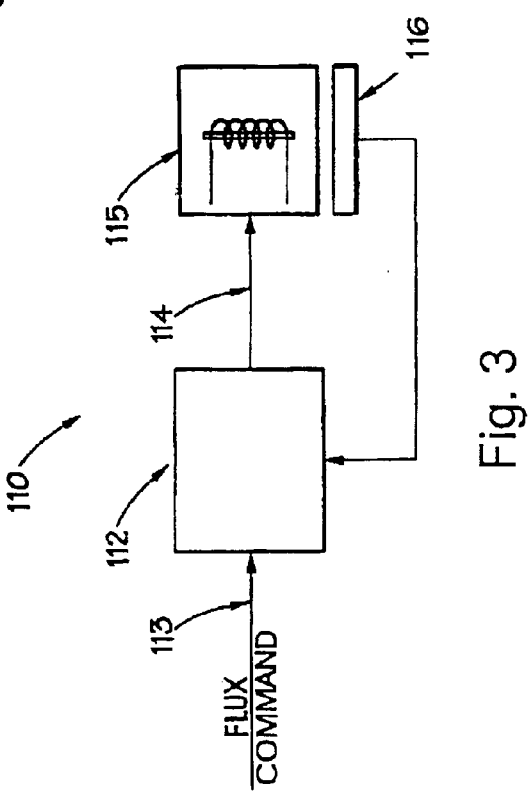
Fig. 3

FLUX FEEDBACK CONTROL SYSTEM

CROSS-REFERENCE TO RELATED APPLICATIONS

This application is a Continuation-In-Part of U.S. patent application Ser. No. 09/738,467, filed Dec. 15, 2000, pending, and this application is also a Continuation-In-Part of U.S. patent application Ser. No. 09/845,673, filed Apr. 30, 2001, now U.S. Pat. No. 6,404,154 which itself is a Continuation-In-Part of U.S. patent application Ser. No. 09/513,906, filed Feb. 25, 2000, now U.S. Pat. No. 6,225,767, which is a continuation of U.S. patent application Ser. No. 09/088,922, filed Jun. 2, 1998, now U.S. Pat. No. 6,091,215. All of the above-identified patent applications and patents are incorporated herein by reference. The subject matter of this application also is related to the subject matter of British Patent Application Nos. GB 9929994.3 and GB 9929995.0, both filed Dec. 17, 1999, both of which are incorporated herein by reference, and U.S. patent application Ser. No. 09/738,468, filed Dec. 15, 2000, which is incorporated herein by reference.

BACKGROUND OF THE INVENTION

1. Field of the Invention

Aspects of the present invention relate to flux control systems and, more particularly, to flux control systems for use in motion control applications. Aspects of the present invention also relate to the control of electric machines, such as switched reluctance machines, permanent magnet machines and hybrids thereof.

2. Description of Related Art

In many electromagnetic systems, the transfer of energy from one component of the system to another is critical to proper operation of the system. In many electromagnetic systems, this transfer of energy is accomplished by appropriately energizing one component of the system to establish a magnetic flux that interacts with another component of the system to transfer energy from the energized component to the other component. Despite the fact that the energy transfer is accomplished by the flux, in known electromagnetic systems the flux of the system is not directly controlled. Instead, the current and/or voltage applied to the energized member is controlled and, based on assumed relationships between current, voltage and flux, it is assumed that the control of the current and/or voltage based on the assumed relationships will produce the appropriate flux. Control of current and/or voltage is typically implemented, at least in part, because the prior art has not provided an efficient, low-cost, and easily implemented system for directly controlling flux in an electromagnetic system.

One drawback of current and/or voltage control systems as described above is that the relationships between current, voltage and flux are not easily represented mathematically and vary in a non-linear manner depending on a variety of variables. For example, the particular characteristics of each piece of magnetic material in a system will result in voltage, current and flux relationships that vary from one system to another and, even within a given system, from one section of the system to another. Because of these differing voltage, current and flux relationships, it is difficult to accurately and properly control the currents and/or voltages to produce the desired flux and, thus, the desired energy transfer. As such, the prior art is limited in its ability to provide an electromagnetic system in which flux is directly controlled.

The lack of an appropriate flux control system in the prior art is particularly noticeable in electromagnetic systems where it is desired to finally control the force exerted by one component of the system on another component of the system. In such systems, the actual force produced by the system is related to the flux established by the energized component of the system. As described above, however, because the prior art cannot directly and finely control flux, it cannot, therefore, finely control the force produced by such systems. The inability of the prior art to finely control the forces established in an electromagnetic system is particularly acute in applications where the movement of at least one component of the system must be precisely controlled.

The typical switched reluctance machine comprises a rotor defining rotor poles, a stator defining stator poles, and a set of windings arranged in relation to the stator poles to define one or more phases. In a reluctance machine, energization of one or more phase windings sets up a magnetic flux in the associated stator poles, urging the rotor into a position of minimum reluctance. Timing the sequential energization of the windings according to rotor position induces rotor movement. Switched reluctance machines are well known. More detail is provided in the paper 'The Characteristics, Design and Applications of Switched Reluctance Motors and Drives' by Stephenson and Blake, presented at the PCIM '93 Conference and Exhibition at Nurnberg, Germany, Jun. 21–24, 1993, which is incorporated herein by reference. As is well known in the art, these machines can be operated as motors or generators simply by altering the timing of the application of the excitation to the phase windings.

As explained in the Stephenson and Blake paper, the method of torque production in a switched reluctance machine is quite different from that in conventional machines, e.g. induction or synchronous machines, which are operated by rotating waves of magneto-motive force (mmf) and in which the torque is produced by the interaction of a magnetic field with a current flowing in a conductor. Such machines are known as 'electromagnetic' machines and encompass, e.g., so-called brushless DC machines in which the current is in stator coils and the field is produced by permanent magnets on the rotor. These machines require the use of permanent magnets.

By contrast, switched reluctance machines are purely 'magnetic' machines, where the torque is produced solely by the magnetic field as the reluctance of the magnetic circuit changes. It follows that the methods of controlling the two types of machine are typically quite different, since the control is related to the method of torque production. In general, the control methods used for conventional, sinusoidally fed machines have been considered quite inappropriate for switched reluctance machines.

FIG. 1 shows a typical switched reluctance machine in cross section. In this example, the stator 10 has six stator poles 12, and the rotor 14 has four rotor poles 16. Each stator pole carries a coil 18. The coils on diametrically opposite poles are connected in series to provide three phase windings. Only one phase winding is shown, for clarity. The control of the switched reluctance machine can be achieved in a variety of ways. The machine could be controlled in an open-loop fashion, i.e. as commonly used for stepping motors. In this regime, the phase windings in the machine are sent pulses in turn and it is assumed that the rotor lines up with each pair of stator poles in turn, i.e. the position of minimum reluctance for that phase which is excited. Of course, because the system is open-loop, there are no means of knowing if the rotor has moved or not. To remove this uncertainty, it is conventional to use a rotor position detection scheme of some sort which provides a signal representative of rotor position. The excitation can then be applied as a function of the position. Such machines are often referred to as "rotor position switched machines".

Since current in the windings is relatively easy to measure, closed-loop current control is commonly accomplished by monitoring and controlling the energizing current in the windings. However, the desired output of the machine is usually torque, position or speed, and current has a highly non-linear relationship to all of these. The result is that current control techniques generally have inaccuracies in the output, such as torque ripple, position error or speed error.

A typical switched reluctance drive is shown in FIG. 2. In this example, the machine 36 corresponds to that shown in FIG. 1. The three phase windings A, B and C are switched onto a d.c. supply V by a set of power electronic switches 48. The moments at which the switches operate are determined by the controller 38, which may be implemented either in hardware or in the software of a microcontroller or digital signal processor. The firing signals are sent to the switches via a data bus 46. Closed loop current feedback is provided by sensing the phase currents by one or more current sensors 44 and feeding back signals proportional to phase current. The control algorithms often include a proportional (P), proportional-plus-integral (P+I), time optimal, feedback linearized, proportional/integral/derivative (PID) function, or one of many others as is well understood in the art. It is also common for an outer control loop of position or speed to be provided by feeding back a rotor position signal from a position detector 40.

In operation, a current demand $i_D$ on line 42 is provided to the controller and this regulates the current in the windings, according to the particular control scheme adopted, to produce the desired output from the machine. Those skilled in the art will be familiar with the many variations of current controllers that exist, each of which has its own merits, but all of them suffer from the problems of non-linearity between the controlled variable and the machine output described above.

In the paper 'Torque Control of Switched Reluctance Drives' by P. G. Barrass and B. C. Mecrow, ICEM'96 Proceedings, International Conference on Electrical Machines, Sep. 10–12, 1996, Vigo, Spain, Vol 1, pp 254–259, incorporated herein by reference, there is a proposal to provide a torque control by reference to flux linkage reference waveforms using a look-up table that stores fixed values of flux ramps for co-ordinates of supply voltage, phase current and rotor position. The flux values and co-ordinates are specific to a particular motor. At any instant the prestored values of flux and torque are chosen from measurements of phase current and the stored machine data. There is a fixed relationship between the monitored variables and the values of the flux waveforms in the look-up table that are used to produce an output for a given motor.

SUMMARY OF THE INVENTION

According to aspects of the invention, a flux control system includes a flux controller, adapted to receive a flux command as an input and to provide a phase coil energization signal as an output, an electromagnetic system adapted to receive the phase coil energization signal, the electromagnetic system comprising at least one phase coil, and a flux observer adapted to provide a feedback signal to the flux controller, the feedback signal corresponding to flux in the electromagnetic system, wherein the phase coil energization signal provided by the flux controller energizes the electromagnetic system such that flux in the electromagnetic system follows the flux command. The electromagnetic system can include an electromagnetic actuator. The electromagnetic system can include a plurality of phase coils, and the energization signal is in the form of an energization vector that includes separate energization signals for each of the phase coils. The electromagnetic system also can include a single phase coil. The flux observer can include a Hall-effect probe, such as a thin-film Hall-effect device. The flux observer also can include a Gauss meter.

According to additional aspects of the invention, an electrical machine includes a rotor, a stator operably coupled with the rotor, at least one phase winding operably coupled with the rotor and stator and arranged to establish flux in a magnetic circuit in the machine, and a flux observer adapted to produce a signal indicative of flux-causing voltage across the at least one phase winding. The flux observer can include a Hall-effect device. The flux observer is arranged in a flux path of the machine. The flux observer is operable to produce the signal as a voltage or current directly proportional to the flux. The machine is a brushless electrical machine, according to aspects of the invention, the rotor is an unmagnetized rotor, and the stator is an unmagnetized stator. The observer can include a search coil arranged in relation to the magnetic circuit to produce the signal indicative of the flux-causing voltage. The machine is a switched reluctance machine, according to aspects of the invention.

According to additional aspects of the invention, an electrical drive system includes an electrical machine having a rotor, a stator and at least one phase winding arranged to establish flux in a magnetic circuit in the machine, an observer adapted to produce a feedback signal proportional to flux-causing voltage across the or each phase winding, and a flux controller having an input signal representing demanded output of the machine, which controller is responsive to the input signal and the feedback signal to produce control signals for actuating at least one switch to control the flux in the at least one phase winding. The observer includes a transducer operably coupled with the or each phase winding, includes a search coil, is part of a flux estimator adapted to produce a flux signal proportional to flux in the or each phase winding from the feedback signal, and/or is operably coupled with a voltage model of the machine for producing the feedback signal. The estimator includes a current model of the machine arranged to receive signals representing phase current and rotor position and is operable to produce a flux estimate for the or each phase winding therefrom. The estimator includes at least one comparator for producing a current model error signal from the flux estimate and the feedback signal.

The observer is operably coupled with a voltage model of the machine for producing the feedback signal, according to aspects of the invention, and further includes at least one adder for summing output of the voltage model and differentiated output of the current model to produce the feedback signal. The estimator includes a current model controller arranged to apply a control law function to output of the current model, the current model controller having a response to machine speed such that a current model output signal is increasingly attenuated with increasing machine speed above a predetermined machine speed. The observer is operably coupled with a voltage model of the machine for producing the feedback signal, and the system is adapted to cause output of the current model to dominate output of the voltage model at relatively low machine speeds, and to cause output of the voltage model to dominate output of the current model at relatively high machine speeds. The electrical machine is a switched reluctance machine, according to aspects of the invention.

According to additional aspects of the invention, a method of controlling an electrical machine having a rotor, a stator and at least one phase winding includes arranging a transducer in a magnetic circuit of the machine to produce a flux signal indicative of the flux in the at least one phase winding, producing an input signal representing a demanded output of the machine, and controlling energization of the at least one phase winding in response to the input signal and the flux signal. The electrical machine is a switched reluctance machine, according to aspects of the invention.

These and other aspects and advantages according to the invention will be apparent upon reading the remainder of this application.

BRIEF DESCRIPTION OF THE DRAWINGS

The present invention can be put into practice in various ways, some of which will now be described by way of example with reference to the accompanying drawings, in which:

FIG. 3 illustrates a flux control system according to certain aspects of the present invention;

FIGS. 4 and 5 illustrate in greater detail one exemplary embodiment of a flux control system as illustrated in FIG. 3;

DETAILED DESCRIPTION OF PREFERRED EMBODIMENTS

Figure 1:
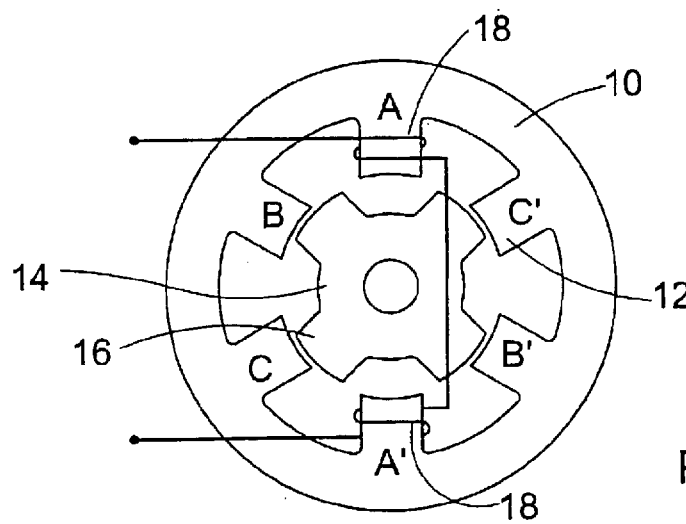
FIG. 1 is a schematic diagram of a known switched reluctance machine.

It has been recognized by the inventor that a fundamental control variable in electric machines, e.g. switched reluctance machines, is the flux that is set up in the magnetic circuit in the machine when a phase winding is energized. The flux is directly responsible for the force that acts on the rotor to urge it to a position of minimum reluctance, i.e. to pull the rotor around, with respect to the energized stator poles. Certain embodiments of the invention use closed-loop real-time determination and control of flux to achieve much better performance from the machine than has hitherto been possible with closed-loop control of current.

In practice, it has been realized, current control is particularly sensitive to variations in the machine. In contrast it has been found that flux control is substantially dependent only on the flux-causing voltage across the phase winding (s). Thus, it is found to be more tolerant of these variations in the machine. Many of the practical uncertainties arising from the manufacturing variations to which current control is prone are simply avoided.

It also has been recognized by the inventor that a machine operating characteristic that is relatively easily determined, and that relates directly to the flux, is the voltage across the phase winding, according to embodiments of the invention. The voltage across a winding can be integrated to derive an actual flux signal, as will be explained. A disadvantage of this is that the time between integrator resets increases with decreasing speed of the rotor, leading to inaccuracies that, of course, become intolerable particularly at standstill. Thus, it is also possible to estimate the flux from the current in the phase winding using a current model of the machine, for example, according to a state observer arrangement. While there is no integral term in deriving the flux from a current model, and it is therefore unaffected at low speeds, it makes reference to the angular position of the rotor with respect to the stator and is therefore less accurate at higher speeds.

The current model is not sensitive to phase resistance, so the current model can be usefully arranged to dominate at "low speed" when little voltage is necessary to generate the required flux linkage. If the system is adaptive, the phase resistance can be more easily estimated at low speed while the observer is relying on the current model. At high speed the current model will be less accurate due to angle measurement errors being magnified as the speed increases. More applied phase voltage is required, according to embodiments of the invention, to generate the necessary flux linkage over the shorter phase cycle time. Therefore, a voltage model (the integral with respect to time of the difference between the voltage applied to a phase and the voltage drop across that phase resistance) also can be employed. A voltage model is not sensitive to angle measurement error and is less sensitive to phase resistance at high speed. A voltage model will also model complex effects like mutual inductance between phases in a simple manner. The total phase flux linkage is derived no matter which phase mmf is responsible.

Turning to the drawings and, in particular, to FIG. 3, a flux control system 110 constructed according to certain aspects of the present invention is shown. In general, system 110 includes a flux controller 112 that receives at an input flux command 113 and provides as an output a phase coil energization signal 114. The phase coil energization signal 114 is provided, through appropriate means, to an electrical machine 115, which is, for example, an electromagnetic system. A flux observer 116 provides a feedback signal to flux controller 112 that corresponds to the flux in the electromagnetic system 115. In general, the flux controller 112 provides phase coil energization signals 114 that energize the electromagnetic system 115 such that the flux in the electromagnetic system 115 follows the flux command 113.

The electrical machine or electromagnetic system 115 may be any machine or system that includes at least one phase coil and a core, for example, where the phase coil can be energized through the application of electric power (e.g., through the application of controlled voltage and/or current) to establish a flux in the core. For example, the machine 115 may be as simple as an iron-core inductor with a phase coil wrapped about a core or a transformer having primary and secondary windings each wound about a core. Machine 115 may also include a switched reluctance machine, as will be explained.

The flux control system 110 of the present invention has application to electromagnetic systems 115 that constitute electromagnetic actuators where energization of the system 115 produces movement of a movable member. For example, the flux control system of FIG. 3 has applicability to electromagnetic systems 115 that include a main core (or a plurality of magnetically uncoupled cores) about which one or more phase coils are wound. In such embodiments, a movable member is typically provided that interacts with the core when the core is energized such that energization of the core causes movement of the movable member. The movable member may be a piece of paramagnetic material such as steel, or a stack of laminations of such materials that interacts with the energized core in a manner similar to the interaction between the rotor and stator of a reluctance machine. Alternately, the movable member may include one or more permanent magnets (or electromagnets or even induction coils) that interact with the energized core in a manner similar to the interaction between the rotor and stator of a permanent magnetic machine. While the following discussion is in the context of one or more particular electromagnetic systems 115, it will be understood by those of ordinary skill in the art that the flux control system 110 described may be used with a number of electric machines and electromagnetic systems 115 and that the discussion herein is for purposes of illustrating and explaining the present invention and not for limiting the scope of the claims presented herein.

In FIG. 3, the electromagnetic system 115 is illustrated as having only a single phase coil. In applications where the electromagnetic system 115 includes a plurality of phase coils, the energization signal 114 may take the form of an energization vector that includes separate energization signals for each of the individual phase coils. In such applications, the flux command 113 may take the form of a flux command vector that includes separate flux command signals for each of the various phase coils. In such applications, the flux associated with each of the phase coils may be independently controlled. For purposes of clarity, the following discussion initially focuses on the structure and operation of the flux controller 112 in the context of a system having a machine or system 115 including only a single phase coil. Those of ordinary skill in the art will appreciate that a multi-phase flux controller 112 can be constructed by simply duplicating the single-phase flux control system described herein.

FIGS. 4 and 5 illustrate in greater detail one exemplary embodiment of flux control system 110. FIG. 5 illustrates an electric drive circuit for energizing the electromagnetic system 115 and FIG. 4 illustrates a control circuit that provides the control signals for the drive of FIG. 5. The drive of FIG. 5 will be discussed first.

In the illustrated embodiment, the electromagnetic system 115 is illustrated as a single phase coil wound about a core. The phase coil defines two ends. The two ends of the phase coil are coupled across a high voltage DC bus ($V_{HDC}$) by a switching bridge comprising upper switching device 117, lower switching device 118, lower flyback diode 119 and upper flyback diode 120. Switching devices 117 and 118 may be any suitable controllable switching device such as a power MOSFET, BJT, BIFET, IGBT, MCT, standard FET or other suitable switching device that can be controlled through application of a control signal. In the illustrated embodiment, upper switching device 117 is controlled by control signal SU and lower switching device 118 is controlled by control signal SL. Flyback diodes 119 and 120 may be any device exhibiting diode-like (e.g., one-way) current characteristics.

In general, the switching signals SU and SL may be actuated to produce three switching conditions: (i) a first condition where both the upper and lower switching devices 117 and 118 are rendered conductive; (ii) a second condition where only one of the switching devices is rendered conductive; and (iii) a third condition where neither switching device is rendered conductive. When the switching signals SU and SL are in the first condition, such that both upper and lower switching devices 117 and 118 are rendered conductive, the phase coil 118 will be coupled across the $V_{HDC}$ bus, thus causing electric current to flow from the positive rail of the $V_{HDC}$ bus ($+V_{HDC}$) through the phase coil of electromagnetic system 115 to the ground of the $V_{HDC}$ bus. This current flow will cause energy to be transferred from the $V_{HDC}$ bus to the electromagnetic system 115, thus resulting in an increase in the flux of the system 115.

When the switching signals SU and SL are in the second condition, such that only one of the switching devices 117 or 118 is rendered conductive and the other is rendered non-conductive, the voltage applied across the phase coil of system 115 will be approximately zero. Under this second switching condition, any current in the phase coil will "freewheel" through the conductive switching device and one of the flyback diodes. For example, if there is current in the phase coil 115 and the signals SU and SL are such that the upper switching device 117 is rendered conductive and lower switching device 118 is non-conductive, the current in the phase coil will "freewheel" from the positive rail of the $V_{HDC}$ bus, through the phase coil, and back to the positive rail of the $V_{HDC}$ bus through upper flyback diode 120. The voltage applied across the phase coil in such circumstances will be the voltage drop across flyback diode 120 plus the voltage across device 117, or approximately zero voltage. A similar substantially zero-voltage condition will be obtained when lower switching device 118 is rendered conductive and upper switching device 117 is non-conductive. Under such circumstances, the current will freewheel through lower switching device 118 and lower flyback diode 119. When the current in the phase coil is in a freewheel condition, the flux established by the phase coil will remain substantially constant or decrease slightly. As such, the energy in the electromagnetic machine, and thus the flux, will remain substantially constant or decrease slightly.

When the switching signals SU and SL are in the third condition, such that both the upper and lower switching devices 117 and 118 are open, any current in the phase coil upon the initiation of this switching condition will continue to flow because the phase coil is an inductive element and the current cannot instantaneously drop to zero. Because the upper and lower switching devices 117 and 118 are non-conductive, however, the path for this current flow will be from the ground rail of the $V_{HDC}$ bus, through lower flyback diode 119, through the phase coil of the system 115, and to the positive rail of the $V_{HDC}$ bus through the upper flyback diode 120. Thus, in this third condition, the phase coil of system 115 will be coupled in a negative fashion across the $V_{HDC}$ bus such that the negative of the $V_{HDC}$ bus is applied across the phase winding. This application of the negative of the $V_{HDC}$ bus to the phase winding will tend to rapidly drive any flux and hence current in the phase winding down to zero. Thus, when the SU and SL signals are in the third condition, energy stored in the electromagnetic system 115 will be dissipated or returned to the $V_{HDC}$ bus and the energy in the system, and thus the flux, will drop.

Those of ordinary skill in the art will appreciate that the particular switching scheme illustrated in FIGS. 4 and 5 is but one such scheme that may be used to control the energization of a phase coil. Other switching schemes, for example, switching schemes utilizing a full H-bridge with four switching devices, may be used. In general, any switching arrangement may be used to implement the systems described herein that allow for the energization of the phase coil to be controlled such that the flux in the system 115 is increased, remains substantially constant, or is reduced.

In the embodiment of FIGS. 4 and 5, the switching signals SU and SL are provided by flux controller 112. A schematic representation of an exemplary flux controller 112 is provided in FIG. 4.

Referring to FIG. 4, the illustrated flux controller 112 comprises a summing junction 125 that receives at a positive input a flux command signal 113 corresponding to the desired flux level, and at a negative input, a flux feedback signal from flux observer 116 that corresponds to the flux in the electromagnetic system 115. Summing junction 125 subtracts the flux feedback signal from the flux command 113 to produce an error signal that varies with the difference between the actual flux and the desired flux. When the flux error signal is positive, the flux command is greater than the flux feedback and it will be necessary to increase the flux in system 115 to bring the flux in line with the flux command. When the error signal is negative, the feedback flux is greater than the flux command, and it will be necessary to decrease the flux in the system 115 to bring the flux in the system in line with the flux command. The error signal from summing junction 125 is first amplified by amplifier 126 and then provided to an energization control circuit 121.

Energization control circuit 121 generates switching signals SU and SL to increase, decrease, or stabilize the flux in the electromagnet system 115 depending on the magnitude of the error signal.

Energization control circuit 121 may take many forms. For example, the controller may utilize a form of conventional pulse width or pulse frequency modulation to control the energization of the phase coil. Alternately, the energization control circuit 121 may take the form of a controller that will close both switching devices 117 and 118 when the error signal is positive; open both switching devices when the error signal is negative; and open one switching device and close the other when the error signal is zero. In accordance with one embodiment of phase controller 121, the switching signals SU and SL are controlled such that the error signal is driven to zero and allowed to freewheel until the error signal falls outside of a controlled hysteresis band. Such a time hysteretic controller is referred to herein as a "return to zero error" or RZE controlled. The described RZE controller is advantageous in that, for applications where the desired flux command is not rapidly changing and the available power is large enough to force tracking relatively quickly, it provides for rapid tracking of the flux command signal such that the "delay" in the flux reference tracking is less than one sampling period of the control system.

Figure 6:
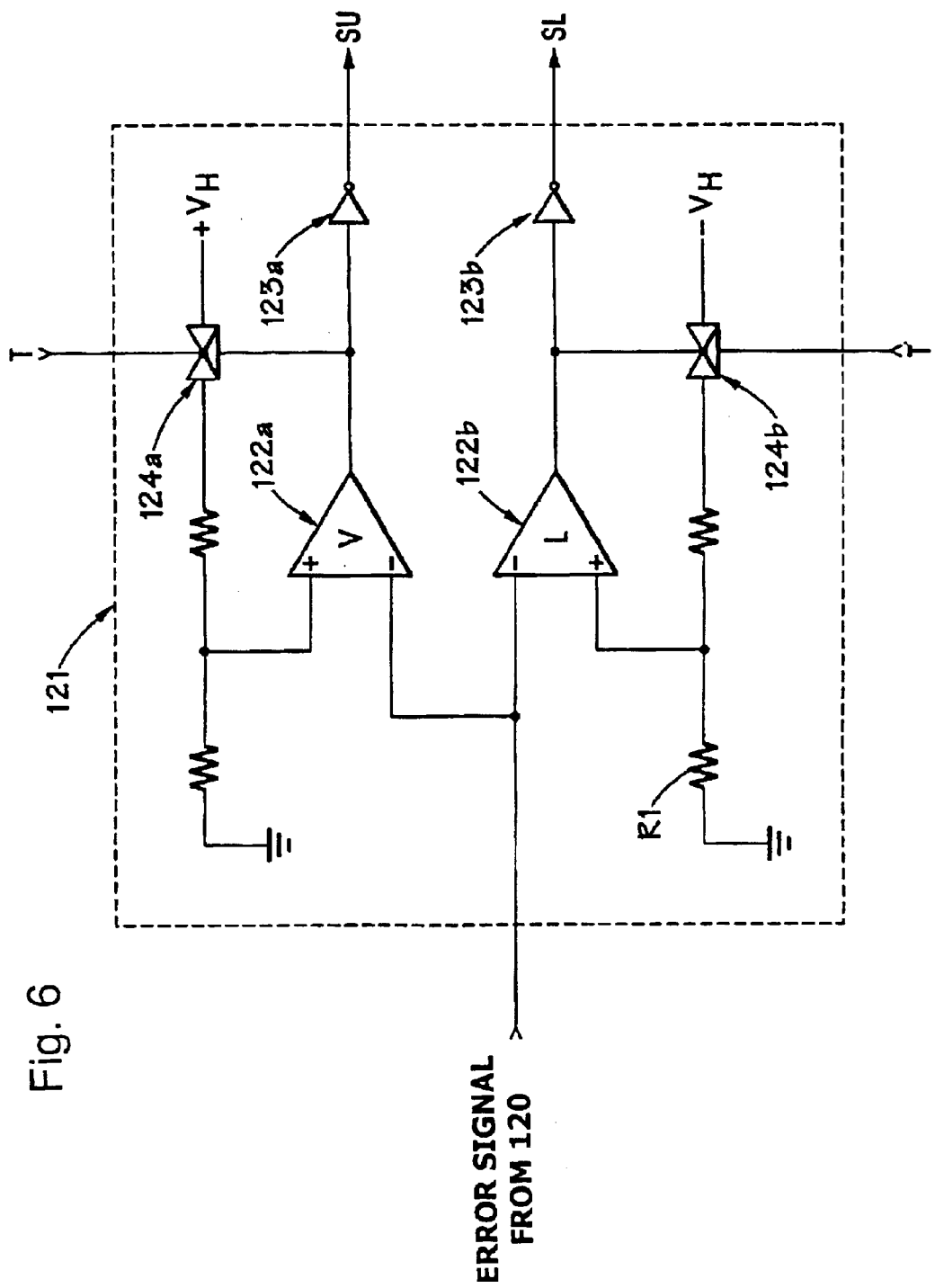
FIG. 6 illustrates an exemplary embodiment of a return to zero error control circuit.

A detailed schematic illustrating one embodiment of an RZE control circuit as described herein is illustrated in FIG. 6. In general, the RZE controller 121 of FIG. 6 includes an upper comparator 122a and a lower comparator 122b that, together, establish two adjacent, asymmetric, hysteresis bands, centered about zero error. Each of the comparators handles only one polarity of error. The outputs from the two comparators are provided to inverters 123a and 123b and the outputs of the two inverters correspond to the SU and SL signals.

In general, when the magnitude of the error signals from amplifier 126 is large and positive (indicating that there is a need to increase the flux in the electromagnetic system) the outputs of both comparators 122a and 122b will be low. Assuming that the upper and lower switching devices 117 and 118 are of the type that are rendered conductive when positive voltage is applied to the control gates of the devices, the low outputs of the comparators 122a and 122b will be inverted by inverters 123a and 123b to produce high level SU and SL signals, thus placing the switching devices into the first switching conduction, such that the flux in the electromagnetic system 115 will tend to increase.

When the magnitude of the error signals from amplifier 126 is large and negative, the outputs of both comparators 122a and 122b will be high. These high signals will be inverted by inverters 123a and 123b, resulting in low voltage SU and SL signals that will cause both the upper and lower switching devices 117 and 118 to be rendered non-conductive, thus driving the current in the electromagnetic system (and, thus, the flux) down.

When the error signal from amplifier 126 is between large positive and large negative values, the status of switching signals SU and SL will depend on the magnitude of the error signal as it compares to the hysteresis voltages $+V_H$ and $-V_H$. In the illustrated embodiment, the application of the hysteresis voltages $+V_H$ and $-V_H$ is controlled by a trigger signal T such that, when T (124a) is logic high, the hysteresis voltage $+V_H$ is applied to the positive input of the comparator 122a and no hysteresis voltage is applied to lower comparator 122b and that when T (124b) is logic low, the hysteresis voltage $-V_H$ is applied to lower comparator 122b and no hysteresis voltage is applied to upper comparator 122a. As explained below, the trigger signal T changes state to control the application of the hysteresis voltages $+V_H/-V_H$ to the comparators 122a and 122b.

Assume that initial conditions exist where the trigger signal is logic high, and the flux in the electromagnetic system 115 is below the command flux such that the error signal from amplifier 126 is large positive and the outputs of comparators 122a and 122b are both low (resulting in logic high SU and SL signals). Under such conditions, the flux in the system 115 would begin to increase and, thus, the magnitude of the error signals from the amplifier 126 would begin to decrease. At some point, the magnitude of the error signal will begin to decrease from a large positive value towards zero. At the point where the error signal reaches and passes zero, the output of the lower comparator 122b (which has no hysteresis feedback) will change state, thus resulting in a transition of the SL signal from high to low. This will cause the switching arrangement to be placed into the second switching condition, such that the current in the electromagnetic system 115 will freewheel, resulting in a constant or slightly decreasing flux. This change in the state of the SU and SL signals will also cause a change in the state of the trigger signal T, thus resulting in the application of the $-V_H$ feedback voltage to the lower comparator. If the flux decreases to the point where the error signal from amplifier 126 now drops below the hysteresis value, the output of the lower comparator 122b will change states again, resulting in the SL signal changing from low to high and thus again applying power to the electromagnetic system 115 causing the flux in the system 115 to increase, and chopping will occur at error signals between $-V_H$ and zero.

Assume that a second set of initial conditions exists where the trigger signal is logic low, and the flux in the electromagnetic system 115 is above the command flux such that the error signal from amplifier 126 is a large negative and the outputs of comparators 122a and 122b are both high (resulting in logic low SU and SL signals). Under such conditions, the flux in the system 115 would begin to decrease and, thus, the magnitude of the error signal from amplifier 126 would begin to increase. At some point, the magnitude of the error signal will increase from a large negative value to zero. At the point where the error signal reaches and passes zero, the outputs of both the upper and lower comparators 122a and 122b will have changed state, thus resulting in a transition of both the SU and SL signals from logic low to logic high. This will cause the switching arrangement to be placed into the first switching condition, such that the current in the electromagnetic system 115 will increase, resulting in an increasing flux. This change in the state of the SU and SL signals will also cause a change in the state of the trigger signal T, thus resulting in the application of the $+V_H$ feedback voltage to the upper comparator 122b. If the flux increases to the point where the error signal from amplifier 126 now exceeds the hysteresis value, the output of the upper comparator 122b will change states again, resulting in the SU signal changing from logic high to logic low. The SL signal will remain logic high, and thus, the switching arrangement will be placed into the freewheel condition causing the flux in the system 115 to remain constant or slightly decrease, and chopping will occur at error signals between zero and $+V_H$.

Thus, as described above, the hysteretic controller of FIG. 6 can control the flux in the electromechanical system 115 such that the flux: (i) is increased when the flux is below the desired level by a negative hysteresis amount; (ii) is decreased when the flux is above the desired flux level by a positive hysteresis amount; and (iii) allowed to remain substantially constant or decrease slightly when the flux is between the positive and negative hysteresis values. Additional details concerning the structure and operation of a hysteretic controller of the type described in connection with FIG. 6 may be found in U.S. Pat. No. 5,530,333 entitled "Control of an Inductive Load" by Michael J. Turner, issued on Jun. 25, 1996, the entirety of which is hereby incorporated by reference.

Those of ordinary skill in the art having the benefit of this disclosure will appreciate that the flux controller 121 of FIG. 6 is but one of a number of various flux controllers that may be used to implement the flux control system of FIG. 3.

Referring back to FIG. 3, it may be noted that in the illustrated flux control system 110, a flux feedback signal from flux observer 116 provides an indication of the level of flux in the electromagnetic system 115. The flux observer 116 may take the form of a flux sensor (e.g., a Gaussmeter); a Hall-effect probe such as a thin-film Hall device; a SQUID (superconducting quantum interference device); or a flux calculator using, e.g., the flux curved gap measurement of a given coil.

For systems in which the phase coils of electromagnetic system 110 are energized such that there are regular periods during which each phase coil experiences a zero flux condition (i.e., each coil has zero flux in it for a non-zero interval), the flux associated with each coil may be estimated by an open-loop flux observer that is reset to zero during a known zero flux interval for that phase coil. Such an open-loop flux observer may provide an indication of the flux through application of the known relationship between the flux associated with a coil and the voltage applied and current in that coil. That known relationship is reflected in Equation 1 below:

Flux=Integral of $[V\_phase\_n(t) - i\_phase\_n(t) * R]/Nt$ (1)

where $V\_phase\_n(t)$ is a signal corresponding to the phase coil voltage as a function of time; $i\_phase\_n(t)$ is a signal corresponding to the phase coil current as a function of time; R is a value corresponding to the phase coil resistance; and Nt is the number of turns comprising the phase coil.

A conventional open-loop integrator may be used to determine the approximate flux for each phase coil. To avoid drift problems, the open-loop flux integrator may be reset to zero during known zero flux conditions to minimize the build-up of uncertainty in the integrator over time. The reset of the integrator may occur either on a timed basis (where the zero flux conditions occur at known time intervals) or the integrator may be a simple clamped integrator. When the electromagnetic system 115 is energized such that only unipolar flux is established in the system, a clamped integrator that is clamped to zero may be used.

Figures 7, 8:
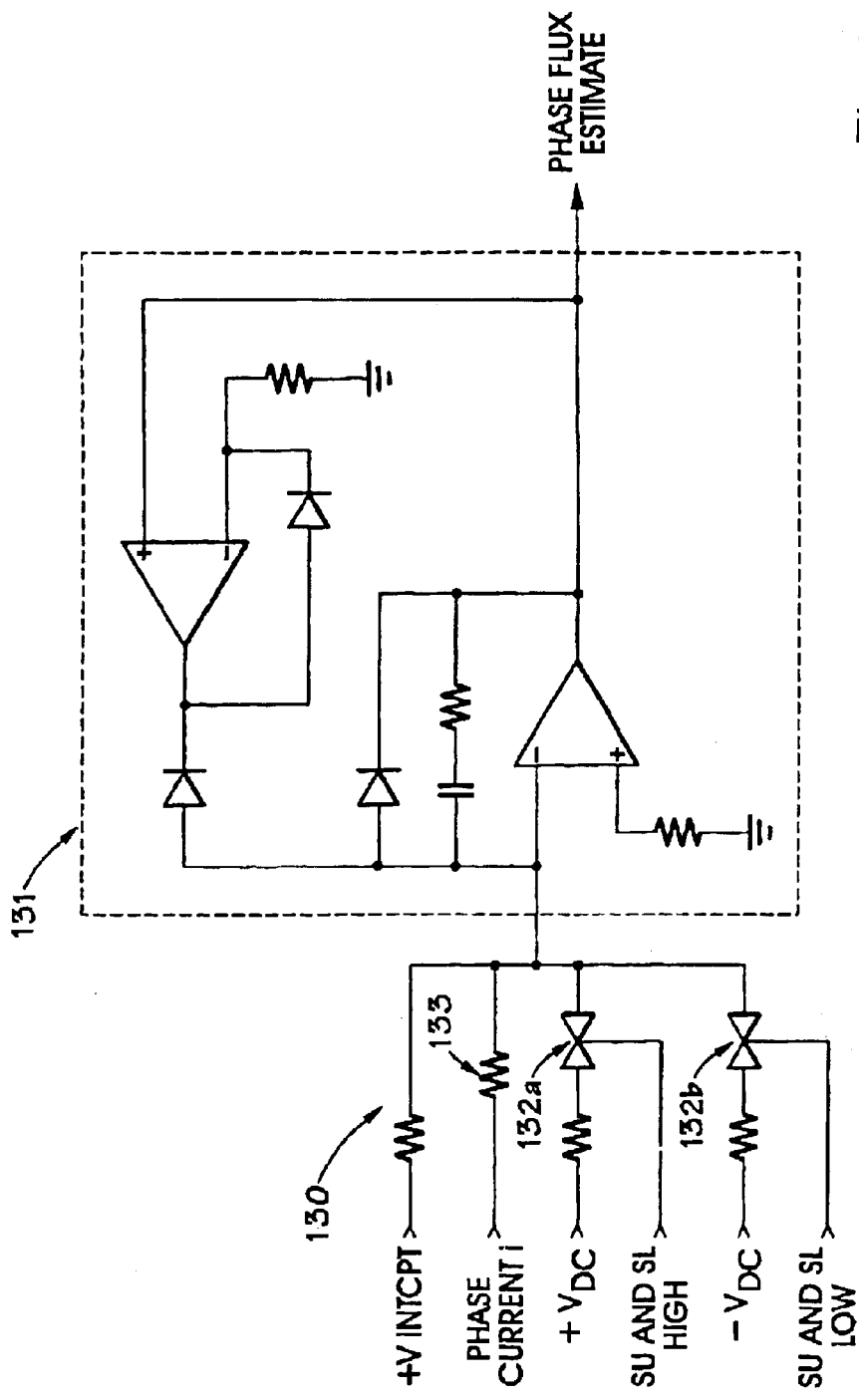
FIG. 7 generally illustrates an exemplary embodiment of an open loop flux observer that may be used in the control system of FIG. 3.
FIG. 8 generally illustrates a circuit utilizing a low pass filter providing a signal corresponding to flux in an electromagnetic system.

FIG. 7 generally illustrates an exemplary embodiment of an open-loop flux observer 130 that may be used in the control system 110 illustrated in FIG. 3. Referring to FIG. 7, the exemplary open-loop flux observer comprises a clamped integrator circuit 131 that receives as its input a signal that is equal to the sum of four voltage input signals. The four voltage input signals that determine the input to the integrator circuit 131 are, from top-to-bottom in FIG. 7: (i) a +V INTCP voltage that corresponds to a constant voltage drop that is associated with the operating of the power switching devices 117 and 118; (ii) a voltage signal corresponding to the magnitude of the phase current i; (iii) a $+V_{DC}$ signal that is switchably coupled to the input of the inverter 131; and (iv) a $-V_{DC}$ signal that is switchably coupled to the input of the inverter 131. The $+V_{DC}$ and $-V_{DC}$ signals correspond to DC voltage levels that are related, in a known manner, to the positive and negative levels associated with the high voltage $V_{HDC}$ that is applied to the phase coil of system 115. Typically, the $+V_{DC}$ and $-V_{DC}$ signals will be proportionally less than the $+V_{HDC}$ and $-V_{HDC}$ signals associated with the high voltage DC bus.

In the embodiment of FIG. 7, the $+V_{DC}$ signal is coupled to the input to integrator 131 via a controlled switch 132a that is rendered conductive when both the SU and SL signals are logic low (i.e., when the switching arrangement coupled to the phase coil is actuated such that the $+V_{HDC}$ bus is applied to the phase coil). In a similar manner, the $-V_{DC}$ signal is coupled to the input to integrator 131 via a controlled switch 132b that is rendered conductive when both the SU and SL signals are logic high (i.e., when the switching arrangement coupled to the phase coil is actuated such that the $-V_{HDC}$ bus is applied to the phase coil). The output of the clamped integrator is −1* the flux (the signal is inverted). An amp with gain=−1 can be used at the output of the clamped integrator to see the flux estimate. The inversion of the flux estimate is taken advantage of at the flux controller error amplifier. The error amplifier is a summing amp with the flux ref and flux estimate as inputs resulting in K gain (flux ref−flux estimate) at its output.

Because of the known relationship between the $+V_{DC}$ and $-V_{DC}$ signals and the $V_{HDC}$ bus, the voltage appearing at the input to the integrator 131 will correspond directly to the voltage that is applied to the phase coil. As such, an integration of the input voltage applied to an integrator will yield a signal that directly corresponds to the flux in the electromagnetic system 115. The circuit shown has an output of flux estimate clamped >0.

The use of switching devices 132a and 132b and the $+V_{DC}$ and $-V_{DC}$ signals to provide a signal representing the actual voltage applied to the phase coil is believed to be beneficial because the magnitude of the actual DC bus value is typically relative high (on the order of several hundred volts of more). As such, it would take large and costly components to directly integrate the relatively high voltages that are applied to the phase coil. By using the approach of FIG. 7, less expensive, lower voltage devices may be used to provide an accurate indication of the flux in the system 115. Those of ordinary skill in the art having the benefit of this disclosure will appreciate that the actual voltages applied to the phase coil could be used to generate the input voltage for integrator 131. Alternately, search coils using a proportion of the phase voltage could be used and integrated directly form the coil.

In the exemplary circuit of FIG. 7, the phase current is applied to a resistor 133 to provide a voltage signal that is intended to correct the input to integrator 131 for coil resistance. The value of resistor 133 used for the correction operation described above may be selected in a number of different ways. For a relatively simple correction factor, the value of resistor 133 maybe selected as an unchanging value that represents an estimate of the phase coil resistance over the expected operation conditions of the associated electromagnetic system 115. Because R will vary with temperature and other operating factors, the selected R value will only be an approximate estimate of the actual R value for each phase windings. The current compensation can be improved if the R value is measured/estimated/calculated through the use of a thermal model and electrical measurements or techniques currently used to estimate actual resistances, such as DC voltage injection.

Referring back to FIG. 7, it will be noted that, even through the drive switching, signals SU and SL are used to develop a low-voltage signal corresponding to the high-voltage signal actually applied to the phase coil, the current used to derive the current-correction factor is the actual phase current i, not the switch currents. The actual phase current should be used to provide a more accurate current-correction factor since the switch current will not necessarily correspond to the phase current. In embodiments where the actual voltages applied to the phase coils are estimated though the use of drive switching signals and a low-voltage bus, the current-correction factor will have to be appropriately scaled prior to subtracting the current-correction factor from the voltage corresponding to the voltage applied to the phase coils.

While true integrators may be used to obtain an estimation of the flux in system 115 as described in connection with FIG. 7, in many applications a more simplistic approach may be used. Particularly, when the flux in the system 115 is bi-polar zero mean (discontinuous or continuous), the flux of the system may be approximately estimated by simply low-pass filtering the voltage applied to the phase coil (V–iR) (or low-pass filtering a voltage that like the voltage applied to integrator 131 of FIG. 7 corresponds to the phase coil voltage). Such estimating of the flux of the system 115 through the use of low-pass filters is beneficial in certain applications because it may minimize the drift and random walk problems associated with certain integrators. FIG. 8 generally illustrates such an approach where a signal corresponding to the phase coil voltage (which may be corrected for the coil resistance) is applied to a low-pass filter 134 to provide a signal corresponding to the flux associated with the phase coil. The provided signal will also reflect a device voltage drop that always opposes the driving voltage and would change sign in applications involving bi-polar excitation currents.

When low-pass filters are used in place of integrators to estimate the flux of a given phase coil, the time constant of the filter should be higher than the period associated with the fundamental frequency of flux excitation for that coil. For example, if the phase coil is being energized at a fundamental frequency of 100 Hz (a period of 10 msec), the time constant for the low-pass filter for that phase coil should be approximately 50 msec. or greater. Given the approximately 5:1 ratio (or greater) of the filter time constant to the voltage fundamental frequency and the zero average voltage of each coil voltage, the low-pass filters will approximately integrate the coil voltage to provide a useful estimate of the coil fluxes.

The flux control system 110, and its various components, described above in connection with FIGS. 3–8, may be beneficially used in a number of different applications. For example, the flux control system 110 may be used to control the flux in a rotating electric machine, such as a conventional induction motor, universal motor, a switched reluctance motor or a permanent magnet motor or hybrid motor (e.g., PM and SR). Embodiments used in connection with a switched reluctance machine are described below with reference to FIGS. 11–17. The flux control systems described herein may also be used in various calibration devices in which the flux passing through a core must be controlled to a predetermined desirable level. Still further, the flux control systems described herein may be used to control electromagnetic actuating devices wherein the movement of a movable member is controlled through controlling the flux passing through one or more paramagnetic cores.

Figure 9:
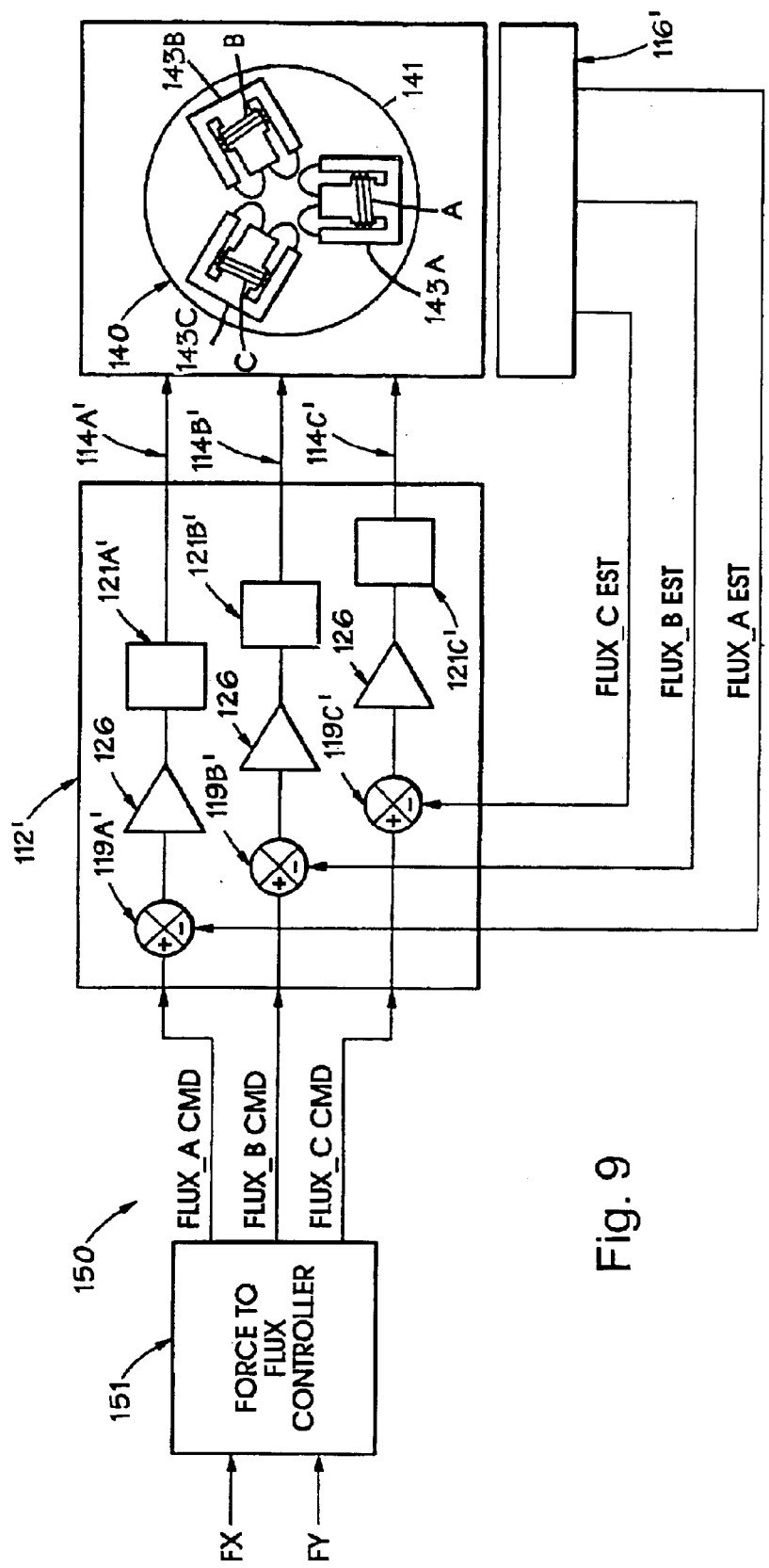
FIG. 9 generally illustrates one example of a force control system implementing desired force to flux transformation constructed according to certain teachings of the invention.

Referring to FIG. 9, a force control system 150 is illustrated that includes an electromagnetic actuator 140. In general the electromagnetic actuator 140 comprises a stationary outer assembly 141 and a movable member positioned within a bore defined by the stationary assembly 141. In the illustrated embodiment, the stationary outer assembly 141 comprises three, substantially identical, magnetically uncoupled flux generators comprising E-cores 143A, 143B and 143C. Each E-core comprises a stack of substantially identical laminations of a paramagnetic material (e.g., steel) that defines an E-shaped core having a central arm and two secondary arms, where the secondary arms are positioned on either side of the central arm. A yoke portion couples the central arm to the secondary arms. In the illustrated embodiment, for each E-core, the width of the central arm is greater than the width of the secondary arms. In one embodiment, for each E-core, the widths of the two secondary arms are substantially identical and are approximately one-half, or slightly less than one-half, of the width of the central arm. In general, the same construction techniques used to construct the stator cores of switched reluctance machines may be used to construct the E-cores 143A, 143B and 143C.

Positioned about the central arms of each of the E-cores 143A, 143B and 143C is a phase coil. In the illustrated embodiments, each of the phase coils A, B and C has the same number of turns and is formed in the same manner such that the three phase coils A, B and C are "symmetric." Each phase coil is positioned about the central arm of its respective E-core such that, when electrical energy is applied to the phase coil, a current will be established in the phase coil that will establish a flux through the E-core. The flux paths for the three E-cores are substantially identical and the flux path of each E-core defines a central flux path through the central arm and two secondary flux paths through the secondary arms.

It may be noted that the arrangement of the three E-cores, 143A, 143B and 143C, is such that a generally triangular bore is defined by the E-cores. Positioned within this bore is a substantially triangular shaped movable member. In the illustrated embodiment, the movable member comprises a stack of substantially identical laminations of paramagnetic material (e.g., steel), although alternate embodiments are envisioned wherein the movable member includes permanent magnets (induction coils) or electromagnetics.

As those of ordinary skill in the art having the benefit of this disclosure will appreciate, in the electromagnetic actuator 140 of FIG. 9, energization of one of the phase coils of one of the E-cores will produce a force on the movable member tending to cause movement of the movable member towards the energized E-core. This is because whenever a phase coil is energized, the movable member will tend to move to a position where the reluctance of the energized phase coil is minimized. Thus, if the phase A coil associated with E-core 143A is energized, the movable member will tend to move downwards towards the E-core 143A to minimize the reluctance of the energized A coil.

Other features of actuator 140 are described in e.g. U.S. Pat. No. 6,091,215, incorporated by reference above.

Actuator 140 is energized by a flux controller 112' that receives as input desired flux commands, flux_A_cmd, flux_B_cmd, and flux_C_cmd and flux feedback signals flux_A_est, flux_B_est and flux_C_est. The flux estimate commands are provided by a flux estimator 116' that, on a per phase coil basis, may take the form of any of the flux observers described above in connection with flux observer 116 of FIG. 3. The flux controller 112', on a per-phase basis, compares the flux command to the flux estimate at a comparator 119', amplifies the error signal at amplifier 126' and generates appropriate phase coil energization signals through use of a energization control circuit 121.' The construction of controller 112' may—on a per-phase basis—follow the description provided above in connection with the flux controller 112 of FIG. 3. The drive circuitry required to energize the phase coils A, B and C is not illustrated in FIG. 9, although it will be apparent to those of ordinary skill in the art having the benefit of this disclosure.

Coupled to the flux controller 112' is a force-to-flux controller 151 that receives at its inputs desired force commands in a given reference frame (the X, Y reference frame in FIG. 9) and provides at its output appropriate flux commands in terms of flux_A_cmd, flux_B_cmd and flux_C_cmd. The flux commands are received and acted upon by the flux controller 112' in a manner similar to that previously described in connection with flux controller 112 of FIG. 3.

While the force-to-flux controller 151 may be constructed from exclusively analog circuits, in the illustrated embodiment of FIG. 9, force-to-flux controller 151 includes a digital circuit, such as a microprocessor or microcontroller, that is appropriately programmed to implement a desired force-to-flux transformation. The use of a digital circuit to construct the force-to-flux controller can be beneficial, in that, the force-to-flux transformation may be readily implemented through mathematical relationships that are easily implemented in digital circuitry and, in that, the use of digital circuitry allows for easy modification of the force-to-flux transformation. Moreover, when digital circuitry is used to implement the force-to-flux controller 151, the input force commands may be either digital or analog. If analog, some form of analog-to-digital conversion will be required to transform the force commands into appropriate digital values. Similarly, when a digital force-to-flux controller 151 is used, the desired flux commands—if digital—may be required to be converted to analog signals if an analog flux controller is used. The construction and programming of a digital force-to-flux controller 151 will be within the ability of one of ordinary skill in the art having the benefit of this disclosure.

As noted above, the estimation of the flux in the system may be estimated by low-pass filtering, which is simpler than using true integrators, for example. Referring again to FIG. 9, in certain embodiments of the invention each of the flux commands output by the force to flux controller 151 is AC zero mean. In other words, every other flux command "pulse" is inverted. In such a system, a low pass filtering of the coil voltage minus coil current times coil resistance (Vn−In*Rn) is then used as the estimated phase flux linkage.

Force control systems like those described above in connection with FIG. 9 have several advantages not generally available from known systems for controlling an electromagnetic actuator to produce a desired force. For example, in known control systems, the control variable used to obtain a desired force is either the voltage or current applied to the phase coils. These systems are inherently limited because, if voltage control is used, the forces that will be produced will be a non-linear function of the controlled voltage. Such non-linear control problems are, in practice, difficult and costly to implement and do not allow for accommodation of changed operating conditions and/or manufacturing tolerances. If current control is used, the system is open-loop unstable and, for reasonably acceptable performance, the non-linear characteristics of the actuator core must be addressed. This results in the same non-linearity difficulties associated with voltage control systems.

The use of a flux control system as described herein significantly reduces or eliminates many of the difficulties associated with voltage or current control systems. For example, when flux control is used, the force generated across each air gap of each actuator element is proportional to the square of the flux in the air gap. As such, non-linearities of the magnetic material and non-linearities in the electrical dynamics need not be considered to provide acceptable control. Thus, the force and flux control systems described herein can be used to implement simpler and more efficient control schemes that are easier and less costly to design and implement. Further, when coupled with the use of a simple open-loop flux observer as described herein, flux control can result in an extremely efficient and elegant system.

While the force control system of FIG. 9 allows for the efficient control of the force exerted on the movable member of actuator 140, in many applications it is the movement of the movable member (e.g., the position/velocity or trajectory of the movable member)—not the forces exerted thereon—that are desired to be controlled. For such applications, the system of FIG. 9 can be enhanced to add a position/velocity control loop that generates the desired force commands FX and FY in such a manner that the movement of the movable member is controlled in a desired manner. The applications of a position/velocity control system of the type described above are numerous. For example, such a position/velocity control system may be used to construct electromagnetic bearings, as well as shaking and sifting apparatus.

Figure 10:
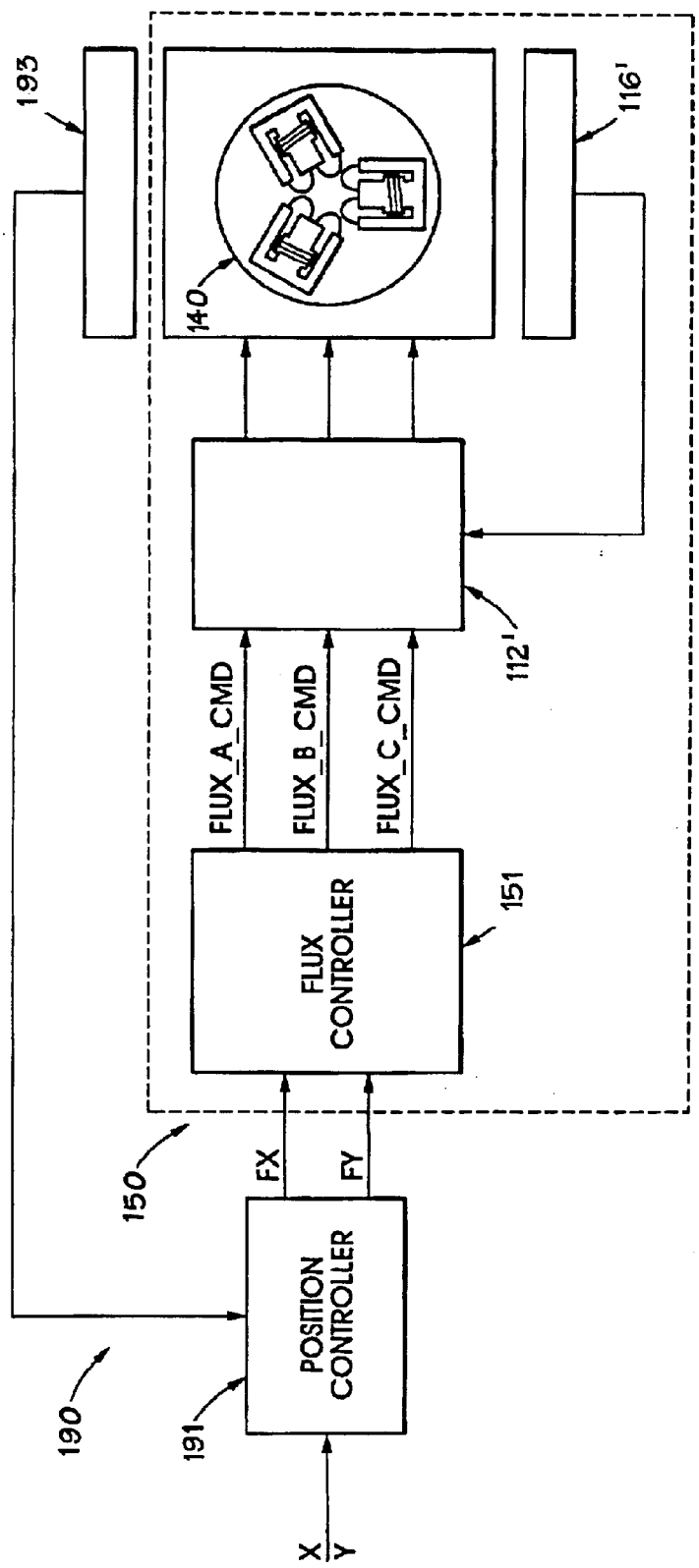
FIG. 10 provides a high-level block diagram of an exemplary position control system constructed according to certain teachings of the present invention.

FIG. 10 provides a high-level block diagram of an exemplary position/velocity control system 190. Those of ordinary skill in the art having the benefit of this disclosure will appreciate that the disclosed position control system can be used to control the position/velocity of a movable member in many applications and systems.

Referring to FIG. 10, the position/velocity control system 190 is identical in many respects to the force control system of FIG. 9. Specifically, within the dashed box 150, the position/velocity control system 190 includes all of the components of the force control system 150 of FIG. 9, all of which operate as described above in connection with FIG. 9.

In addition to including the components of the force control system 150, the position/velocity control 190 includes two additional main components. First, in the embodiment of FIG. 10, the force command signals FX and FY are generated by a position/velocity controller 191. Position/velocity controller 191 receives at its inputs: (i) position command signals representing the desired position/velocity (or trajectory) of the movable member of actuator 140; and (ii) feedback signals from a position/velocity observer 193 that represent current position/velocity or trajectory information associated with the movable member of actuator 140. In general, position/velocity controller 191 compares the position/velocity commands with the position/velocity feedback information to produce position/velocity error signals and uses these position/velocity error signals to generate the appropriate force commands that will tend to bring the movable member to the position/velocity indicated by the position/velocity commands, or to move along the trajectory defined by trajectory commands, when trajectory commands are provided.

The position/velocity controller 191 may take many forms depending on the manner in which the desired position/velocity and/or trajectory of the movable member is defined. In one embodiment, the position/velocity controller 191 may be constructed to control the position and velocity of the movable member of actuator 140 in terms of the position of the movable member in an X,Y reference frame and in terms of the velocity of the movable member in terms of X and Y.

Like the force-to-flux controller 151 described above, the position/velocity controller 191 may be implemented through the use of a programmed digital processor, such as a microprocessor or a microcontroller. In certain applications, the position/velocity controller 191 may be implemented using the same programmed processor that issued to implement the force-to-flux controller. Analog implementations are also envisioned.

In one embodiment of the position/velocity controller 191, the feedback signals representing the X, Y position and velocity of the movable member of actuator 140 are generated through the use of a position/velocity observer 193 that includes conventional accelerometers that are positioned with respect to actuator 140 such that they can provide X and Y acceleration information to controller 191. In that embodiment, the position and velocity in terms of X and Y is derived by the position/velocity controller 191 using low-pass filters that are, for all practical purposes, at frequencies above 170 Hz; integrators. Using low-pass filters, instead of pure integrators, eliminates the drift and variance build-up problems of open-loop integrators.

Figure 11:
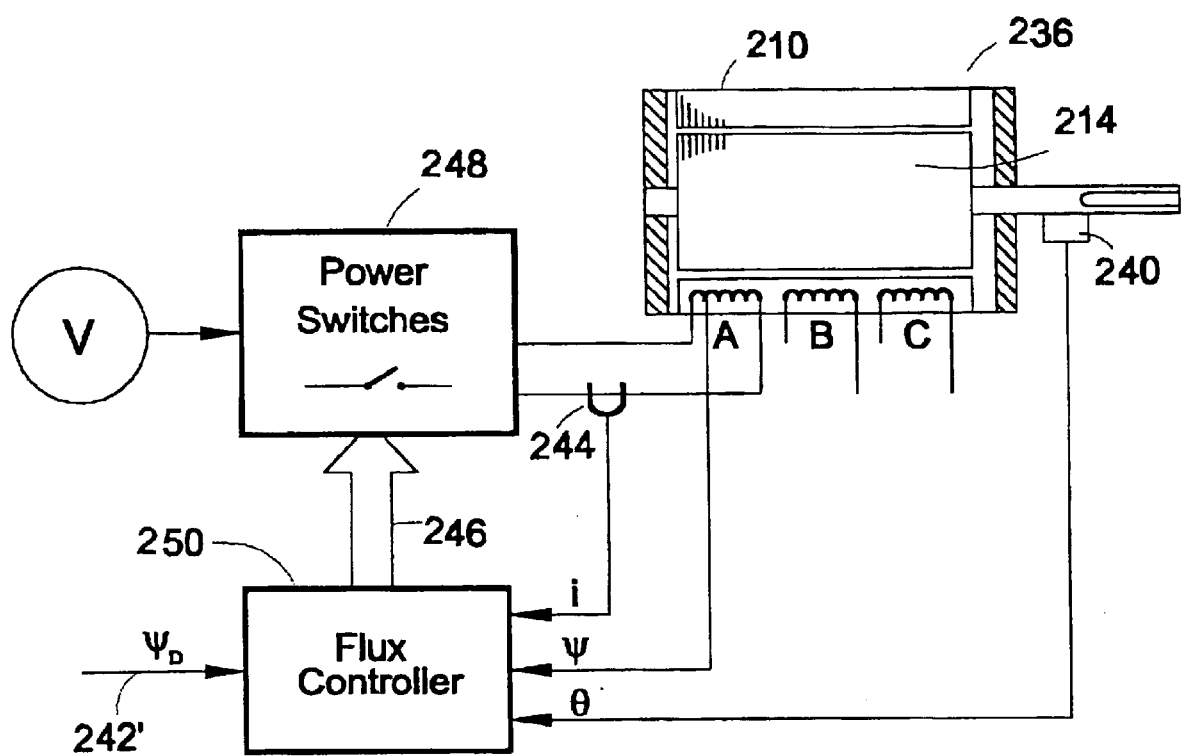
FIG. 11 is a schematic block diagram of a control system for a switched reluctance machine incorporating an embodiment of the invention.

Referring now to FIG. 11, a switched reluctance drive system according to an embodiment of the invention includes a switched reluctance machine 236 having a laminated stator 210 and a laminated rotor 214 in relation to which is arranged a rotor position transducer (RPT) 240. A flux controller 250 produces firing signals for actuating power electronic switches 248 for controlling the energization of the phase windings A, B and C associated with the stator 210. The schematically illustrated connection of only one phase winding is shown for the sake of clarity, but each phase is independently excitable by actuation of the switches. In an alternative embodiment, the excitation for the windings is provided by an amplifier of known type. It will also be appreciated that each phase winding will have associated with it a current transducer 244. Only one is shown for the sake of clarity. The input 242' to the flux controller 250 is a signal representing the desired flux $\psi_D$ in the machine to produce a desired output. In operating the machine as a motor, the desired output is torque, speed or position. In operating the machine as a generator, the desired output is electrical power. The flux demand signal can simply be in the form of a scaled voltage input representing (e.g.) the torque or speed range of the machine.

Figure 2:
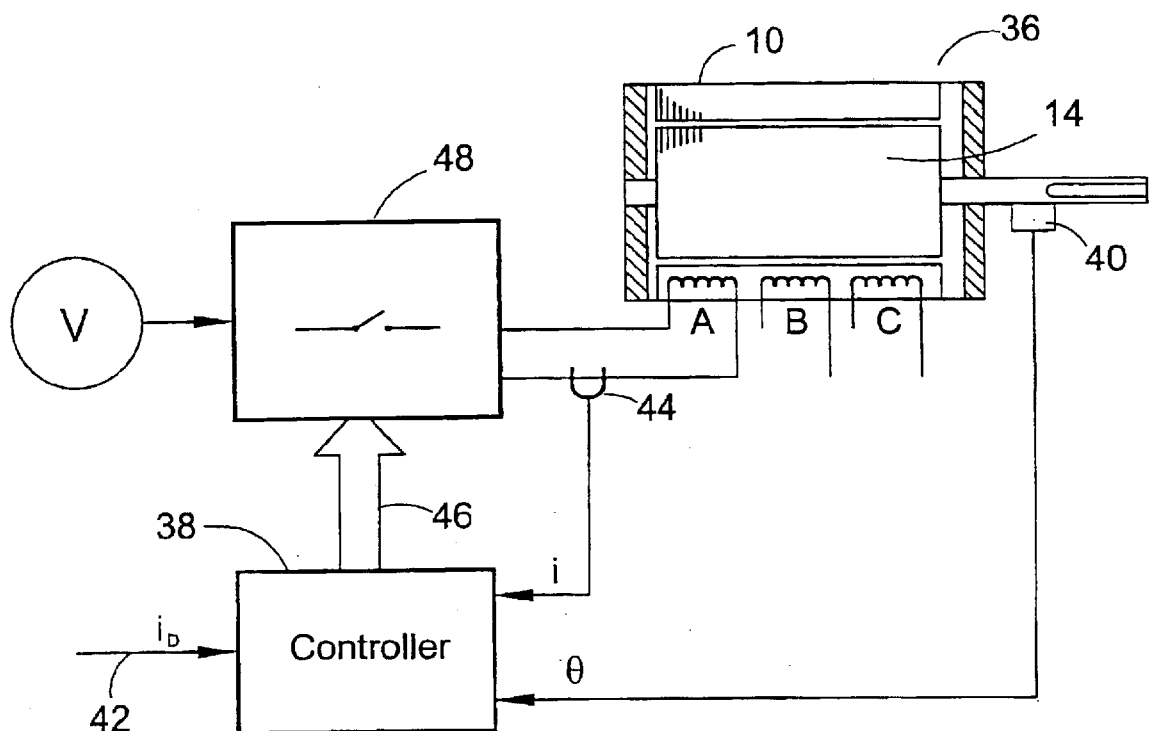
FIG. 2 is a schematic diagram of a known closed loop current controller for a switched reluctance machine.

The flux controller of FIG. 11 is quite different in operation from the controller of FIG. 2. Instead of a current demand controlling the output of the machine, the output is controlled directly by a flux demand: instead of current being the principal parameter fed back to correct the output, flux is now the principal controlled parameter. This is quite different from all known practicable controllers for switched reluctance machines.

In the flux controller 250 of FIG. 11, the flux feedback signal $\psi$ is compared with the demanded flux 242' to produce an error signal. The flux controller can follow any one of a range of control laws, such as proportional, proportional-plus-integral, proportional/integral/derivative, time optimal, feedback linearized action, etc. as described previously. The machine 236 also has a conventional RPT 240, whose output $\theta$ provides timing information to the flux controller 250 in conventional manner. Alternative embodiments use so-called sensorless position detection systems which estimate position from other parameters of the machine, as is known in the art. The flux controller 250 may also receive a current signal i from the current transducer 244, though this is not used in the manner of a conventional current controller: rather, it is used simply to provide overall monitoring of current, to ensure that it stays within a predetermined safe level, and/or feed forward $I_n*R_n$ compensation. The flux controller 250 produces firing signals for the switching devices 248 that control energization of the phase windings. The firing signals are sent to switching devices 248 via data bus 246.

Figure 12:
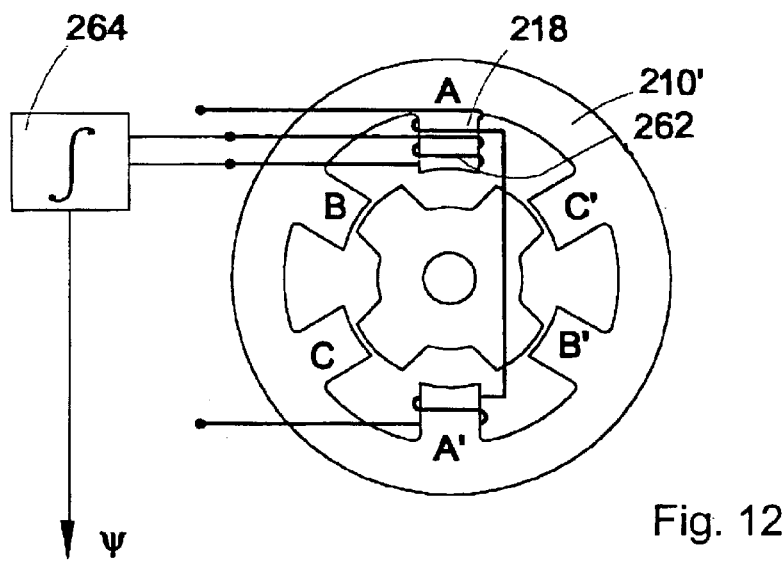
FIG. 12 is a radial cross-section of another embodiment of a reluctance machine according to an embodiment of the invention.

An alternative method of deriving the flux signal $\psi$ is shown in FIG. 12, in which stator 210' has one or more stator poles of each phase winding 218 that carries an additional winding which acts as a search coil 262. The search coil 262 may be wound independently of the phase winding, as shown schematically in FIG. 13, or it may be wound with it in bifilar fashion. In either case, it will have a voltage induced in it when the phase winding is excited which, when integrated with respect to time by an integrator 264, gives a signal directly proportional to the flux linking the search coil 262. The integrated signal is fed back to the flux controller 250 as the flux feedback signal $\psi$.

FIG. 12 shows one search coil 262 for the phase winding, but it will be recognized that a system with one coil on each pole could be used or, alternatively, the coil(s) could be placed around some other part of the magnetic circuit, e.g. around the yoke of the stator core, on a section between two stator poles, where it is able to sense the flux in the magnetic circuit of the machine.

It will be realized that the embodiments shown in FIGS. 11 and 12 are illustrative only and that other methods of producing the flux feedback signal $\psi$ could be used. The main requirement according to certain embodiments of the invention is that the signal $\psi$ used by the flux controller is proportional to the flux in the magnetic path associated with the phase winding being excited.

From the above, it will be apparent to those skilled in the art that real-time, flux-based, closed-loop control can be applied with benefit to any switched reluctance machine with any number of poles and phases. Accordingly, the description of embodiments is herein made by way of example and not for the purposes of limitation.

Figure 13:
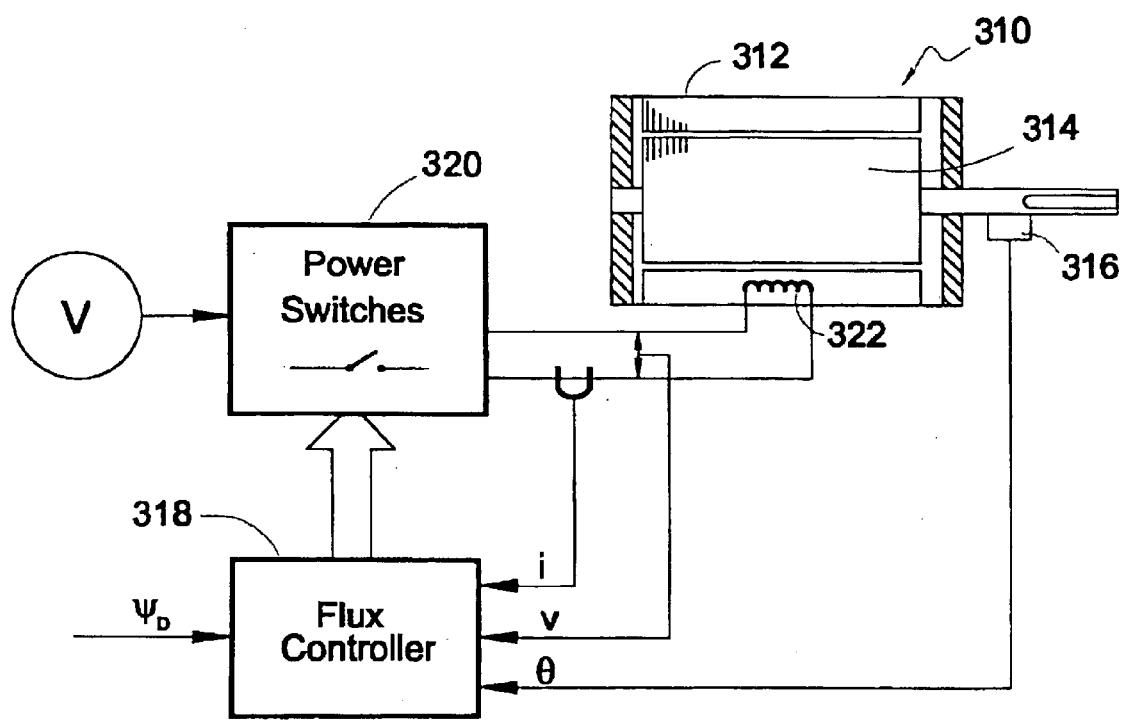
FIG. 13 is a schematic block diagram of a further embodiment of a control system in accordance with an embodiment of the invention.

Referring to FIG. 13, in another form of the invention a switched reluctance drive comprises a switched reluctance machine 310 having a stator 312 and a rotor 314 in relation to which is arranged a rotor position transducer (RPT) 316. The RPT 316 provides rotor position signals θ to a flux controller 318 which produces firing signals for actuating a switching circuit 320 for controlling the energization of the windings 322 associated with the stator. The flux controller 318 is also provided with current and supply voltage signals i and v from the machine.

The flux controller must be able to estimate, or 'model' the flux in the machine, given the quantities of voltage, and/or current and rotor position. It is possible to achieve this in a variety of ways, two of which will be described in detail. Firstly, the flux can be modeled from a knowledge of the voltage applied to the phase and the time for which it is applied. This is called hereafter the 'voltage model'. It can be refined by introducing secondary terms involving current and winding parameters, but essentially is driven by the applied voltage. Secondly, the flux can be estimated from a knowledge of the current in the winding and the rotor position. This is called hereafter the 'current model'. While both of these models can take different analytical or numerical forms, preferred implementations will be described below.

According to this embodiment of the invention, the flux controller 318 uses a state observer to model flux linkage, the observer including both a current model and a voltage model of the flux. It is found that the current model becomes less accurate at high speeds because of increased rotor position sensor error at high speed. The voltage model involves cyclical integration of voltage with respect to time and is, therefore, susceptible to errors at zero and low speeds at which the reset of the integration term occurs increasingly infrequently, leading to drift. Thus, the frequency response of the current model part of the flux estimating system of the embodiment is arranged so that it is dominant at zero and low speeds while the voltage model part is dominant at higher speeds.

The flux $\psi$ in a winding is proportional to the integral of the emf, E, applied to the winding with respect to time:

$$\psi = \int E \, dt$$

Therefore to control accurately the flux in a switched reluctance machine in real time it has been found that it is beneficial to derive a value for the voltage E producing the flux $\psi$. To do this, a search coil or bifilar winding can be arranged in relation to each phase winding, as described above in relation to FIG. 12.

An alternative approach is to develop an estimate for the voltage E which can be based on V, i and a thermal model of, or electrical data for, the winding resistance R. This is less intrusive than a search coil or bifilar winding. Since V is the voltage applied to the phase winding, i is the phase current and R is the phase resistance, $$E = V - iR$$

so $$\psi = \int [V - iR] dt$$

Although if the resistance of winding R drifts then the flux value drifts, this is still a useful method of estimating the flux and, in any case, a thermal model can be set up to track any changes in R. However, in many applications it will be acceptable to choose a single value of R associated, for example, with a set of standard operating conditions or a single operating point. This voltage model will also observe complex effects like mutual inductance between phases in a simple manner. The total phase flux linkage is derived no matter which phase mmf is responsible.

As with any measurement system involving an integrator, care must be taken either to prevent long term drift in the integrator or to avoid depending on its output when drift is likely to be a problem. In this particular case, it is of most concern at or near zero machine speed because the integrator has a significant period between integrator resets during which drift may occur, and no reset at all at zero speed.

It is therefore preferable not to rely on the estimate produced by the voltage model at low speed, but to arrange for a more reliable current model to be used. As $$\psi = \int V - iR \, dt$$

$$\text{Flux } \Phi = (Ni)/\mathfrak{R}$$

(where $\mathfrak{R}$ is the reluctance of the magnetic circuit and N is the number of turns in the phase winding)

$$d/dt(\text{Flux linkage } \psi) = V - iR$$

Thus $$\Phi = (1/N) * \int (V - iR) dt$$

and $$i = \mathfrak{R} * \Phi / N$$

$$\Phi = \int [(V/N) - R * \Phi * \mathfrak{R}/N^2] dt$$

$$\dot{\Phi} = (V/N) - R * \hat{\Phi} * \mathfrak{R}/N^2,$$

the derivative of the flux estimate with respect to time.

$$\frac{\mathfrak{R} * R}{N^2}$$

varies with rotor angle and temperature $$\frac{V}{N}$$

is the true control input to the motor.

Using a combination of the voltage and current models, a flux estimator equation can be written:

$$\dot{\Phi} = (V/N) - R * \hat{\Phi} * \mathfrak{R}/N^2 + K_{obs}(\omega) * (i - \hat{\Phi} * \mathfrak{R}/N),$$

where $K_{obs}$ is the "observer gain" for the current model which is a function of rotor angular velocity $\omega$.

$R * \hat{\Phi} * \mathfrak{R}/N^2$ disappears with the use of a search coil or a bifilar winding.

Now, $K_{obs}$ is a time domain non-linear function that is difficult to derive, but at high speed the value of $K_{obs}$ will go to zero, whereas the $\hat{\Phi}$ term contributes less at low speed. $K_{obs}$ becomes large at low speed and dominates the observer as $K_{obs}$ is based in the rotor angle domain. Thus, this embodiment of the invention decouples the time and angle domain terms by splitting the estimator between current and voltage models and allows each to dominate at different machine speed ranges.

Figure 14:
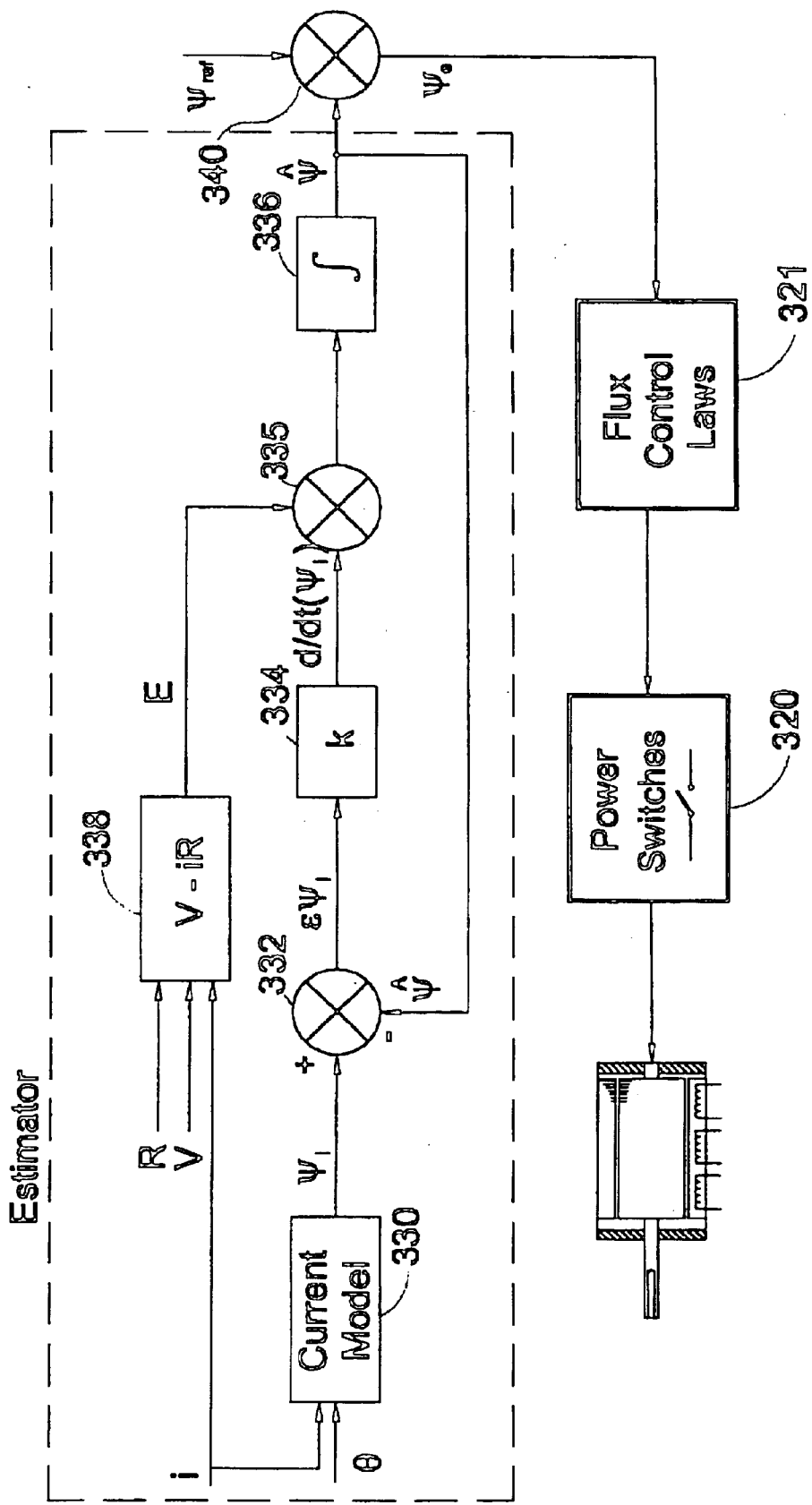
FIG. 14 is a schematic block diagram of part of the system of FIG. 13 according to one particular form of the invention.

This technique of using both models in a closed-loop controller is shown in FIG. 14, in which a current model 330 has inputs of phase current i and rotor position θ. The totality of the estimator is indicated in FIG. 14. The output of the current model 330 is an estimate of flux $\psi_i$, which is fed to a summing junction 332 in which it is combined with the flux estimate $\hat{\psi}$ to produce a difference value $\epsilon\psi_l$ which is provided to a gain matrix 334. In this embodiment the gain matrix 334 is a proportional-plus-integral (P+I) observer gain matrix (error convergence law). The observer gain matrix (error convergence law) can take other forms, such as a PD, PID, hysteretic or predictive controller as will be apparent to the skilled person.

Block 338 receives inputs of phase voltage V, phase current i and estimated winding resistance R and computes the estimate of emf E. (Note that, strictly speaking, this block is only part of the voltage model). Since E=d/dt($\psi$), this value of E can be summed with the value of d/dt($\psi_l$) output from the gain matrix 334, in the summing junction 335 to produce d/dt($\hat{\psi}$). This signal is then supplied to an integrator 336 to produce the flux estimate $\hat{\psi}$. The flux estimate $\hat{\psi}$ is then applied to a comparator 340, together with the flux demand signal $\psi_{ref}$, to produce a flux error signal $\psi_e$ which is applied to control laws 321 to control the switching circuit 320 of FIG. 13.

In FIG. 14 the voltage model 338 for the flux-creating emf E is derived from the phase voltage, phase current and phase resistance estimate. A thermal model to determine the phase resistance $\hat{R}$ by estimation, or an electrical measurement of phase resistance R can be used or a combination of the two. A convenient form of electrical measurement would be by means of a temperature transducer, such as a thermocouple. Such a transducer will usually need a filter to attenuate noise that would otherwise lead to errors in the measurements.

It will be understood by those skilled in the art that FIG. 14 represents a controller for one phase of the machine. If the machine is polyphase, then each phase will essentially have a controller as shown in FIG. 14, though in practice there will be some sharing of circuitry for economy.

The closed loop current model-based estimator fixes drift at low and zero speeds, avoiding distortion of the flux estimate by using the current model in place of the voltage model. The P+I gain matrix 334 has a low enough gain and a response characteristic such that the flux estimate based on the current model from the matrix 334 is not influential at high speeds where the voltage model 338 is dominant, whereas the estimator control law function allows the current model to dominate at low speed. Thus, one aspect of the control regime is that the flux estimator hands over between the current model and voltage model control techniques according to machine speed.

The closed loop flux controller will, therefore, have a high "current model gain" at low speed so the current model dominates and a low or zero current model gain at high speed where the voltage model is more suited (if the current model gain is zero, the integrators should be reset at known "zero flux" intervals). The current model (330 of FIG. 14) could be a look up table or a functional description in the form of an algorithm. The advantage of the functional description is that it is amenable to adaptation via an adaptive mechanism. The functional description can be linear in the coefficients that change via adaptation. Even without the adaptive mechanism, the system uses both the current and voltage models to estimate flux linkage. If the system is adaptive, at low speed the phase resistance will be corrected, whereas at high speed the "current model" and potentially phase resistance will be corrected. The result is essentially no interaction of the adaptive mechanism with the flux observer.

To summarize, the voltage model becomes less and less accurate as motor speed decreases toward zero because:

The open loop integration process will experience drift and random walk (uncertainty growing with time as a result of integrating a signal containing noise) for longer intervals between resets.

At low speed the applied voltage is dropped primarily across the phase resistance which changes with temperature. The effects of the angle varying inductance will be very small at low speeds resulting in a poor signal to noise ratio.

If a low pass filter is used to approximate an integrator at high speeds, the error between low pass filtering and true integration increases as the motor speed decreases. For zero mean a.c. signals a low pass filter can be used alone. If the signals have a d.c. content there must be a reset function or $K_{obs}$ must have a sufficiently high gain.

At high speed the voltage model is accurate and at the same time very simple. The voltage model is more accurate at higher speeds because:

The time between resets is much shorter resulting in less drift and random walk.

At high speeds the voltage is dropped primarily across the angle varying inductance which causes less estimation error due to phase resistance changes.

In the case of using approximate integration (e.g. a low pass filter) the difference between true integration and low pass filtering becomes negligible at high speed for a.c. signals.

The voltage model is a computation of V−i*R (the flux-causing emf E) from which the flux is derived by reset integration or low pass filtering. All of the complex mutual effects are included in this calculation no matter which phase mmf is driving the flux. A complex look-up table, or calculation of a complex function involving all motor phase currents and rotor position, can be very computationally intensive requiring ever more computing power as the motor speed increases. This is a further reason why the current model may not be used at high speeds. Thus, the voltage model can be used to perform the flux estimate in isolation at high speeds. The voltage model does not use the shaft position to instantaneously estimate flux linkage. The increasingly inaccurate shaft position measurements/estimates with increasing motor speed (calculation delays, signal filtering delays, loss of resolution, etc.) are not of concern to the voltage model.

In situations in which less accurate control of the switched reluctance machine is acceptable, or in which flux control is only required at sufficiently high speeds, it is possible to use only the voltage model and not to apply the current model in controlling flux. However, this does not provide the accuracy at zero and low speeds.

Figure 15:
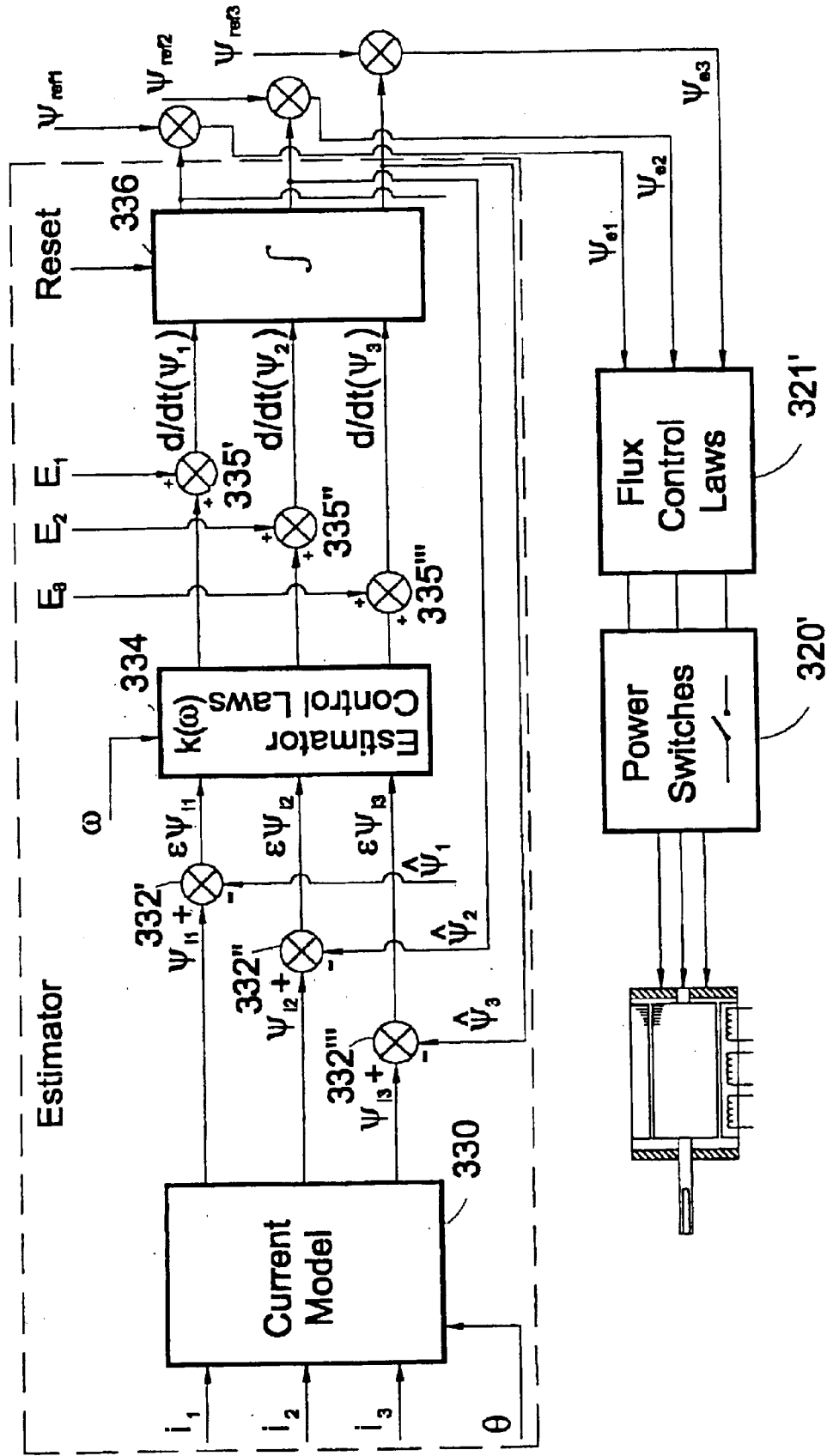
FIG. 15 is a more detailed schematic block diagram of FIG. 14 for a three phase machine.

FIG. 15 is a more detailed three phase example of the flux control system described in FIG. 14. Like reference numerals have been used for equivalent parts in FIGS. 14 and 15. It will be noted that each phase has separate inputs and outputs in respect of the various values of current, voltage and flux.

The three phase SR example of the embodiment described by FIG. 15 includes a closed loop flux observer having the voltage model and the current model 330 of the SR machine phase flux, which predict the flux for each phase as a function of rotor position θ. The respective models are summed into the observer at summing junctions 335', 335" and 335'''.

As stated above, the current model can take many forms, from a look-up table to a functional description of the current in the form of the real-time processed current model. Below are examples of current models that can be used:

Current Model #1 can be presented in the form of a current-product relationship:

$$\psi_{in} = (a_1 i_n + a_2 i_n^2 + a_3 i_n^3 + \ldots) + (b_1 i_n + b_2 i_n^2 + b_3 i_n^3 + \ldots)\cos(\theta_{en}) + $$
$$(c_1 i_n + c_2 i_n^2 + c_3 i_n^3 + \ldots)\sin(\theta_{en}) + (d_1 i_n + d_2 i_n^2 + d_3 i_n^3 + \ldots)\cos(2\theta_{en}) \text{ etc.,}$$

where θ is the electrical or mechanical angle and n is the phase number. $0 \leq \theta_{en} \leq 2\pi$ for phase n. The mechanical angle is used in the model if electrical sub-harmonics are to be included in the model. At any angle, flux is a function of current. However, the coefficients of such a relationship are dependent upon angle. Such a relationship can be described using the current-product relationship presented above.

Mathematically such a relationship is, in the limit, true to arbitrary accuracy due to the nature of the trigonometric and polynomial functions used by virtue of their ability to approximate any continuous function. Electrical sub-harmonics are typically the result of manufacturing variations in a SR machine. The form of Current Model #1 allows each harmonic of a phase flux linkage to change in an arbitrary "smooth" non-linear fashion as a function of that particular phase current. Mutual effects are not considered in Current Model #1.

Current Model #2 uses a hyperbolic tangent form. The generation of flux from current occurs through the physical medium of the motor iron. This material exhibits a relationship between current and flux that can be closely approximated with the hyperbolic tangent function. Such an expansion is also well behaved with respect to out of range values: it exhibits a limiting behavior. Hence, out-of-range values for the object variables do not produce abnormal or pathological behavior in the observer model.

The hyperbolic tangent function may take the form:

$$\psi_{in} = (a_o i_n + a_1 \tanh(i_n) + a_2 \tanh(i_n^2) + \ldots + a_p \tanh(i_n^p)) + $$
$$(b_1 \tanh(i_n) + b_2 \tanh(i_n^2) + \ldots + b_p \tanh(i_n^p)) * \cos(\theta_{en}) + $$
$$(c_1 \tanh(i_n) + c_2 \tanh(i_n^2) + \ldots + c_p \tanh(i_n^p)) * \sin(\theta_{en}) + $$
$$(d_1 \tanh(i_n) + d_2 \tanh(i_n^2) + \ldots + d_p \tanh(i_n^p)) * \cos(2\theta_{en}) + $$
$$(e_1 \tanh(i_n) + e_2 \tanh(i_n^2) + \ldots + e_p \tanh(i_n^p)) * \sin(2\theta_{en}) + \ldots$$

alternatively, $$\psi_{in} = (a_o i_n + a_1 \tanh(i_n) + a_2 \tanh(2*i_n) + \ldots + a_p \tanh(p*i_n)) + $$
$$(b_1 \tanh(i_n) + b_2 \tanh(2*i_n) + \ldots + b_p \tanh(p*i_n)) * \cos(\theta_{en}) + $$
$$(c_1 \tanh(i_n) + c_2 \tanh(2*i_n) + \ldots + c_p \tanh(p*i_n)) * \sin(\theta_{en}) + $$
$$(d_1 \tanh(i_n) + d_2 \tanh(2*i_n) + \ldots + d_p \tanh(p*i_n)) * \cos(2\theta_{en}) + $$
$$(e_1 \tanh(i_n) + e_2 \tanh(2*i_n) + \ldots + e_p \tanh(p*i_n)) * \sin(2\theta_{en}) + \ldots$$

or any mixture of the above two model forms. The above two model forms do not consider mutual effects.

Conveniently, the complicating factor, the effect of mutual inductance between phases, can be addressed by the use of look-up tables containing measured data or another functional form.

Returning to the $K_{obs}$ observer gain matrix 334 of FIG. 14 or 15, it can be any function that ensures that during low and zero speed operation $\epsilon\psi$ goes to zero as time (t) goes to infinity ($\epsilon\psi_n$ is the estimation error between the current model estimate of phase flux linkage, $\hat{\psi}_{In}$, and the complete estimate of phase flux linkage, $\psi_n$). During high speed operation $K_{obs}$ may be set to zero provided the integrators are reset. The low pass filter option may be used with zero mean AC signals for the flux-causing voltage.

The example for a 3-phase machine shown in FIG. 15 is based on the diagonal matrix:

$$\begin{bmatrix} K_1(\omega) & 0 & 0 \\ 0 & K_2(\omega) & 0 \\ 0 & 0 & K_3(\omega) \end{bmatrix}$$

where $K_1$, $K_2$ and $K_3$ are dependent on the angular speed (ω) of the rotor or are constant gains. Constant gains would be used only in a simplified implementation with reduced performance. $K_{obs}$ can be diagonal in this version of the flux observer current model to simplify calculation of $K_{obs}$.

Note that mutual effects are considered in the flux observer models of FIGS. 14 and 15. The current model 330 estimates each phase flux linkage as a function of every phase current and angle. In addition, the total phase (coil) voltage is used by the voltage model portion of the flux observer. The integrator for the or each phase in the voltage model flux observer is reset during known periods of zero (or as near as possible zero) flux in the phase cycle. At high speeds each integrator could also be adapted to act as a low pass filter (with, for example, time constants about 10 times longer than the fundamental frequency of the motor phase switching period) when the supply to the machine has a zero mean a.c. characteristic or a unipolar signal is transformed to a zero mean a.c. representation.

Writing current model #1 in summation form:

$$\psi\_I\_x\_\cos(i\_x, \theta, \text{harm\_max, poly\_max}) = \qquad (2)$$
$$\sum_{n=0}^{\text{harm\_max}} \sum_{m=1}^{\text{poly\_max}} L\_x\_i\_\cos_{n,m}(i\_x)^m \cos(n\theta)$$

$$\psi\_I\_x\_\sin(i\_x, \theta, \text{harm\_max, poly\_max}) = \qquad (3)$$
$$\sum_{n=0}^{\text{harm\_max}} \sum_{m=1}^{\text{poly\_max}} L\_x\_i\_\sin_{n,m}(i\_x)^m \sin(n\theta)$$

$$\psi\_x\text{-}I\_x\_\text{tot} = \psi\_I\_x\_\cos(i\_x,\theta,\text{harm\_max,poly\_max}) + \psi\_I\_x\_\sin(i\_x\theta,\text{harm\_max,poly\_max}) \qquad (4)$$

where harm_max is the highest harmonic of the phase flux linkage profile considered and poly_max is the highest polynomial power considered. This is the expression for current model #1 shown above, but in summation notation.

In a symmetric machine that does not exhibit significant remanence properties due to effects such as lamination grain orientation in the material of the rotor and the stator, ψ_I_x_tot should have only odd polynomial powers. In other words the self-induced flux linkage should have the same sign as the current that produced it.

The effect of mutual inductance or coupling between the phases, in addition to the phase flux linkage generated by the phase current and its self-inductance, must be considered when determining the total phase flux linkage. The steel of a switched reluctance machine is a non-linear medium for flux. Thus, a general form of model for mutual flux linkage between phases is required. To take the example of a three phase machine, the general form of expression above can be modified to be written as:

$$\psi\_x\_I\_x\_I\_y\_I\_z\_\cos(i\_x, i\_y, i\_z, \theta, \text{m\_harm\_max}, \text{poly\_x\_max}, \text{poly\_y\_max}, \text{poly\_max\_z}) = \quad (5)$$

$$\sum_{k=0}^{\text{poly\_x\_max}} \sum_{m=0}^{\text{poly\_y\_max}} \sum_{h=0}^{\text{poly\_max\_z}} \sum_{n=0}^{\text{m\_harm\_max}} \psi\_x\_i\_x\_i\_y\_i\_z\_\cos_{k,m,h,n,} i\_x^k i\_y^m i\_z^h \cos(n\theta)$$

$$\psi\_x\_I\_x\_I\_y\_I\_z\_\sin(i\_x, i\_y, i\_z, \theta, \text{m\_harm\_max}, \text{poly\_x\_max}, \text{poly\_y\_max}, \text{poly\_max\_z}) = \quad (6)$$

$$\sum_{k=0}^{\text{poly\_x\_max}} \sum_{m=0}^{\text{poly\_y\_max}} \sum_{h=0}^{\text{poly\_max\_z}} \sum_{n=0}^{\text{m\_harm\_max}} \psi\_x\_i\_x\_i\_y\_i\_z\_\sin_{k,m,h,n,} i\_x^k i\_y^m i\_z^h \sin(n\theta)$$

If no magnets nor any significant remanence effects are present (which is generally the case for the switched reluctance machine):

$$\psi\_x\_I\_x\_I\_y\_I\_z\_\cos_{0,0,0,n}=0 \text{ and } \psi\_x\_I\_x\_I\_y\_I\_z\_\sin_{0,0,0,n}=0 \quad (7) \& (8)$$

Thus the total flux linkage in any phase can then be written as:

$$\psi\_x\_\text{tot} = \psi\_x\_I\_x\_I\_y\_I\_z\_\cos + \psi\_x\_I\_x\_I\_y\_I\_z\_\sin \quad (9)$$

Since equations (5) through (8) include both the mutually induced flux linkages, which may be affected by mmf polarity-dependent magnetic path changes, and the self-induced flux linkages, no generalization can be made concerning the polynomial exponents as can be made for the self-induced flux linkages in isolation.

Equations (5) and (6) above include both the self-induced flux linkage and the mutually induced flux linkage in a given phase. If the self-induced flux linkage is to be separated from the mutual flux, equations (5) and (6) can be rewritten with different constraints as:

$$m\_x\_I\_x\_I\_y\_I\_z\_\cos(i\_x, i\_y, i\_z, \theta, \text{m\_harm\_max}, \text{poly\_x\_max}, \text{poly\_y\_max}, \text{poly\_max\_z}) = \quad (10)$$

$$\sum_{k=0}^{\text{poly\_x\_max}} \sum_{m=0}^{\text{poly\_y\_max}} \sum_{h=0}^{\text{poly\_max\_z}} \sum_{n=0}^{\text{m\_harm\_max}} m\_x\_i\_x\_i\_y\_i\_z\_\cos_{k,m,h,n,} i\_x^k i\_y^m i\_z^h \cos(n \cdot \theta)$$

$$m\_x\_I\_x\_I\_y\_I\_z\_\cos_{0\ldots\text{poly\_x\_max},0,0,n} = 0 \quad (11)$$

$$m\_x\_I\_x\_I\_y\_I\_z\_\sin(i\_x, i\_y, i\_z, \theta, \text{m\_harm\_max}, \text{poly\_x\_max}, \text{poly\_y\_max}, \text{poly\_max\_z}) \quad (12)$$

$$\sum_{k=0}^{\text{poly\_x\_max}} \sum_{m=0}^{\text{poly\_y\_max}} \sum_{h=0}^{\text{poly\_max\_z}} \sum_{n=0}^{\text{m\_harm\_max}} m\_x\_i\_x\_i\_y\_i\_z\_\cos_{k,m,h,n,} i\_x^k i\_y^m i\_z^h \sin(n \cdot \theta) \; m\_x\_I\_x\_I\_y\_I\_z\_\cos_{0\ldots\text{poly\_x\_max},0,0,n} = 0$$

The total mutually induced flux linkage can then be written as:

$$m\_x\_I\_x\_I\_y\_I\_x \text{ tot} = m\_x\_I\_x\_I\_y\_I\_z\_\cos + m\_x\_I\_x\_I\_y\_I\_z\_\sin \quad (13)$$

Equations (10) through (13) include all of the flux linkage generated in phase x that is not due to I_x alone, in other words, all of the mutual inductances. Since equations (10) through (13) describe the mutually induced flux linkages which may be affected by mmf polarity-dependent magnetic path changes, no generalization can be made concerning the polynomial exponents as can be made for the self-induced flux linkages in isolation.

The total flux linkage in a given phase would then be written as:

$$\psi\_x\_\text{tot}(i\_x\_i\_y\_i\_z, \theta) = \psi\_x\_I\_\text{tot} + m\_x\_I\_x\_I\_y\_I\_z\_\text{tot} \quad (14)$$

Using equations of the form of (5) through (8) the current dependence of the flux linkages can be generalized as:

$$\psi\_x\_I\_x\_I\_y\_I\_z\_\cos(i\_x, i\_y, i\_z, \theta, \text{m\_harm\_max}, \text{poly\_x\_max}, \text{poly\_y\_max}, \text{poly\_max\_z}) = \quad (15)$$

$$\sum_{k=0}^{\text{poly\_x\_max}} \sum_{m=0}^{\text{poly\_y\_max}} \sum_{h=0}^{\text{poly\_max\_z}} \sum_{k=0}^{\text{m\_harm\_max}} \psi\_x\_i\_x\_i\_y\_i\_z\_\cos_{k,m,h,n,} f(i\_x^k) \cdot f(i\_y^m) \cdot f(i\_z^h) \cos(n \cdot \theta)$$

and $$\psi\_x\_I\_x\_I\_y\_I\_z\_\sin(i\_x, i\_y, i\_z, \theta, \text{m\_harm\_max}, \text{poly\_x\_max}, \text{poly\_y\_max}, \text{poly\_max\_z}) = \quad (16)$$

$$\sum_{k=0}^{\text{poly\_x\_max}} \sum_{m=0}^{\text{poly\_y\_max}} \sum_{h=0}^{\text{poly\_max\_z}} \sum_{k=0}^{\text{m\_harm\_max}} \psi\_x\_i\_x\_i\_y\_i\_z\_\sin_{k,m,h,n,} f(i\_x^k) \cdot f(i\_y^m) \cdot f(i\_z^h) \cos(n \cdot \theta)$$

If no magnets nor any significant remanence effects are present (which is generally the case for the switched reluctance machine):

$$\psi\_x\_I\_y\_I\_z\_\cos_{0,0,0,n} = 0 \quad (17)$$

$$\psi\_x\_I\_y\_I\_z\_\sin_{0,0,0,n} = 0 \quad (18)$$

One example of the form of the functions of current seen in equations (15) and (16) is the hyperbolic tangent:

$$f(i\_x^k) = \tanh\left[\left(\frac{i\_x}{\text{norm\_i\_x\_factor}}\right)^k\right] \quad (19)$$

$$f(i\_y^k) = \tanh\left[\left(\frac{i\_y}{\text{norm\_i\_y\_factor}}\right)^k\right] \quad (20)$$

$$f(i\_z^k) = \tanh\left[\left(\frac{i\_z}{\text{norm\_i\_z\_factor}}\right)^k\right] \quad (21)$$

The hyperbolic tangent is just one of a large number of functions that could be chosen. Others include spline descriptions, exponential, etc. The important property of the equations described is that the equations are linear in the coefficients for each poly-harmonic product term (each poly-harmonic term in equations (15) and (16) are linearly dependent on the appropriate $\psi\_x\_1\_x\_1\_y\_1\_z\_\sin\_k\_m\_h$ coefficient). The equations being linear in their coefficients allows for least square parameter estimation. Least squares-based parameter estimation is a well-proven method for adapting system models in an embedded application.

The creation of functional descriptions of the system that are linear in coefficients allows for the application of the theory of linear systems, i.e. parameter estimation techniques, which are well understood and reliable.

For the linear magnetic case, equations (15) through (18) reduce to $$\psi\_x\_I\_x\_I\_y\_I\_z\_\cos(i\_x, i\_y, i\_z\theta, m\_\text{harm\_max}, \text{poly\_x\_max}, \text{poly\_y\_max}, \text{poly\_max\_z}) = \quad (22)$$

$$\sum_{k=0}^{1}\sum_{m=0}^{1}\sum_{h=0}^{1}\sum_{n=0}^{m\_\text{harm\_max}} \lambda\_x\_i\_x\_i\_y\_i\_z\_\cos_{k,m,h,n} \cdot (i\_x^k) \cdot (i\_y^m) \cdot (i\_z^h)\cos(n\cdot\theta)$$

$$\psi\_x\_I\_x\_I\_y\_I\_z\_\cos(i\_x, i\_y, i\_z\theta, m\_\text{harm\_max}, \text{poly\_x\_max}, \text{poly\_y\_max}, \text{poly\_max\_z}) = \quad (23)$$

$$\sum_{k=0}^{1}\sum_{m=0}^{1}\sum_{h=0}^{1}\sum_{n=0}^{m\_\text{harm\_max}} \psi\_x\_i\_x\_i\_y\_i\_z\_\sin_{k,m,h,n} \cdot (i\_x^k) \cdot (i\_y^m) \cdot (i\_z^h)\sin(n\cdot\theta)$$

If no magnets nor any significant remanence effects are present (generally the case for the switched reluctance machine)

$$\begin{bmatrix} \psi\_x\_I\_x\_I\_y\_I\_z\_\cos_{0,0,0,n} \\ \psi\_x\_I\_x\_I\_y\_I\_z\_\cos_{0,1,1,n} \\ \psi\_x\_I\_x\_I\_y\_I\_z\_\cos_{1,0,1,n} \\ \psi\_x\_I\_x\_I\_y\_I\_z\_\cos_{1,1,0,n} \\ \psi\_x\_I\_x\_I\_y\_I\_z\_\cos_{1,1,1,n} \end{bmatrix} = 0 \quad (24)$$

and:

$$\begin{bmatrix} \psi\_x\_I\_x\_I\_y\_I\_z\_\sin_{0,0,0,n} \\ \psi\_x\_I\_x\_I\_y\_I\_z\_\sin_{0,1,1,n} \\ \psi\_x\_I\_x\_I\_y\_I\_z\_\sin_{1,0,1,n} \\ \psi\_x\_I\_x\_I\_y\_I\_z\_\sin_{1,1,0,n} \\ \psi\_x\_I\_x\_I\_y\_I\_z\_\sin_{1,1,1,n} \end{bmatrix} = 0 \quad (25)$$

Or in simplified form equations (22) through (25) become:

$$\lambda\_x\_I\_x\_I\_y\_I\_z\_\cos(i\_x, i\_y, i\_z, \theta, \text{harm\_max\_xx}, \text{harm\_max\_xy}, \text{harm\_max\_xz}) = \quad (26)$$

$$i\_x \sum_{n=0}^{\text{harm\_max\_xx}} \lambda\_x\_i\_x_n \cos(n\cdot\theta) + i\_y \sum_{n=0}^{\text{harm\_max\_xy}} \lambda\_x\_i\_y_n \cos(n\cdot\theta) + i\_z \sum_{n=0}^{\text{harm\_max\_xz}} \lambda\_x\_i\_z_n \cos(n\cdot\theta)$$

$$\lambda\_x\_I\_x\_I\_y\_I\_z\_\sin(i\_x, i\_y, i\_z, \theta, \text{harm\_max\_xx}, \text{harm\_max\_xy}, \text{harm\_max\_xz}) = \quad (27)$$

$$i\_x \sum_{n=0}^{\text{harm\_max\_xx}} \lambda\_x\_i\_x_n \sin(n\cdot\theta) + i\_y \sum_{n=0}^{\text{harm\_max\_xy}} \lambda\_x\_i\_y_n \sin(n\cdot\theta) + i\_z \sum_{n=0}^{\text{harm\_max\_xz}} \lambda\_x\_i\_z_n \sin(n\cdot\theta)$$

The total flux linkage can be written as:

$$\lambda\_x\_tot = \lambda\_x\_I\_x\_I\_y\_I\_z\_\cos + \lambda\_x\_I\_x\_I\_y\_I\_z\_\sin \quad (28)$$

In both the linear and non-linear examples for a three phase SR machine, model forms have been identified that describe the relationship between all three phase currents, angle and phase flux linkage. The expressions described in equations (5) through (28) represent current model forms that describe a three phase SR machine, including mutual effects. The expressions described above in equations (2) through (4) may be used as the current model 330 of FIG. 14 and equations (5) through (28) may be used as the current model 330 of FIG. 15. The model forms described by equations (2) through (28) are linear in the model coefficients and have been verified in practice. Being linear in the model coefficients allows the model forms described in equations (2) through (28) to be tuned via a Recursive Least Squares-based adaptive mechanism.

Figure 16:
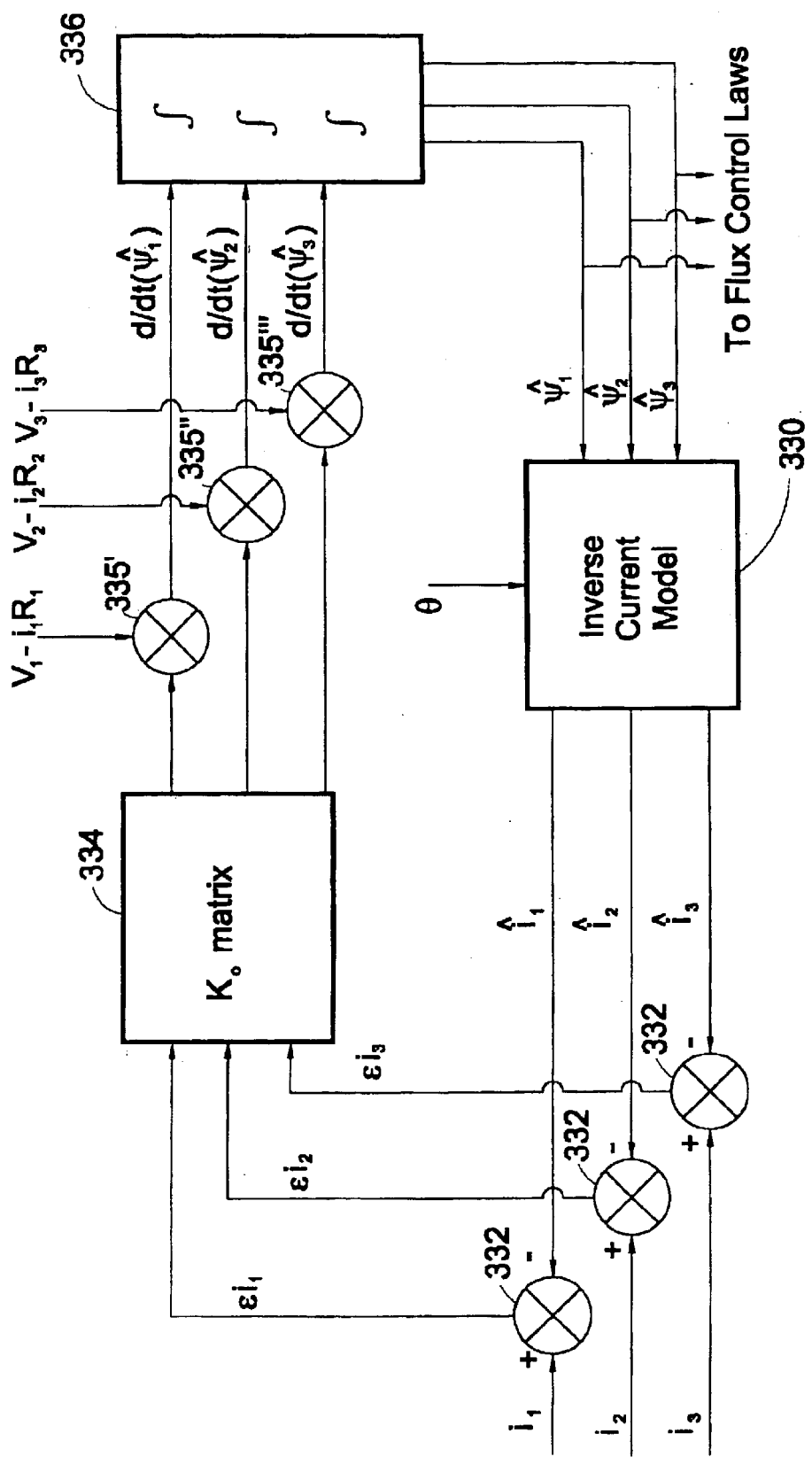
FIG. 16 is a more detailed schematic block diagram of an alternative form of FIG. 14.
Figure 17:
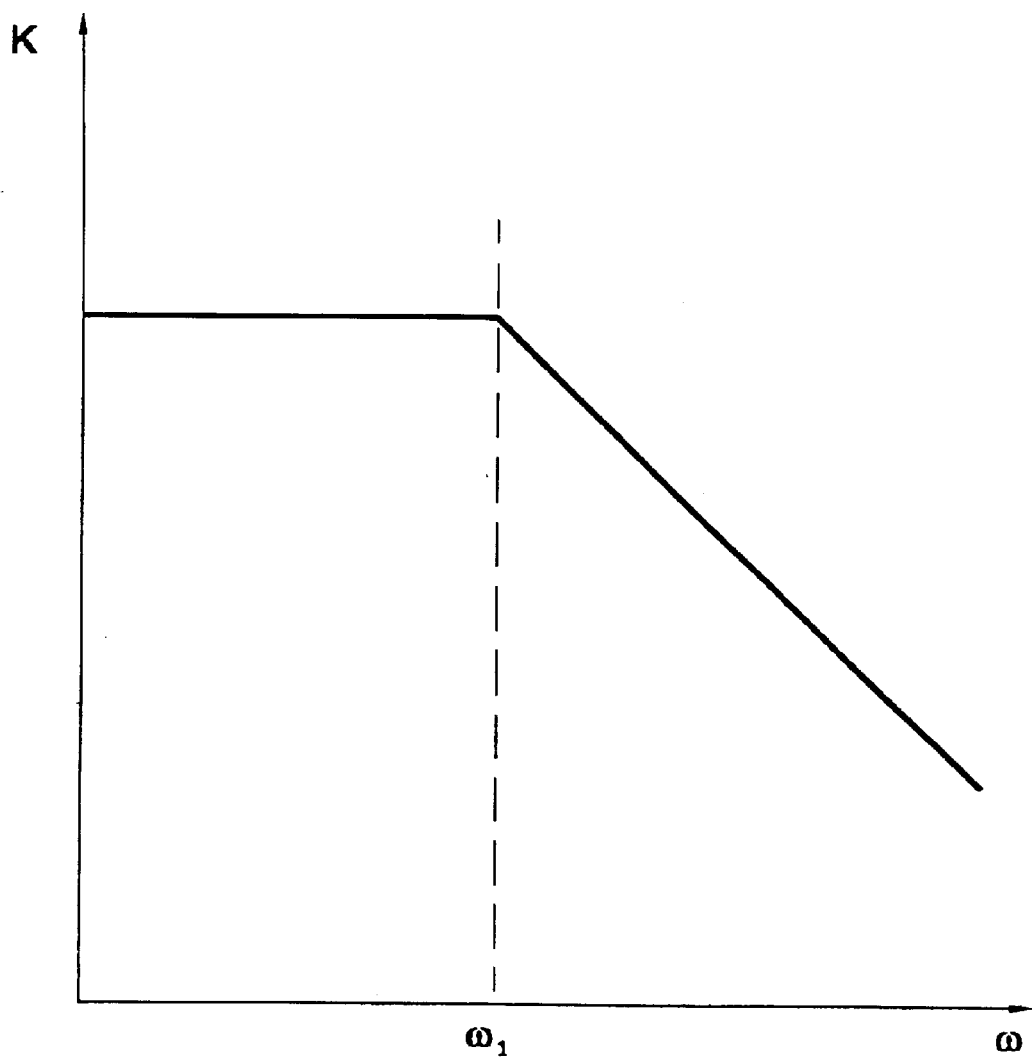
FIG. 17 is a plot of the gain of the current estimator control law with motor speed.

FIG. 16 illustrates an alternative flux observer. In this embodiment a matrix $K_O$ 334 is a function of phase currents $i_1, i_2, i_3$, mechanical rotor angle $\theta$ and rotor angular velocity $\omega$ producing the differential flux estimate output. The flux estimate output of the matrix $K_O$ for each of the three phases is summed with the flux-causing voltage, as before, to derive a value of the rate of change of flux with respect to time $$\frac{d\hat{\psi}}{dt}$$

for each phase. Thus, the integral of this, from integrator 336, will be the flux observer value $\hat{\psi}$ for each phase.

In this embodiment, an inverse current model 330 describes each phase current, $(\hat{i}_1, \hat{i}_2, \hat{i}_3)$, as a function of each phase flux estimate, $(\hat{\psi}_1, \hat{\psi}_2, \hat{\psi}_3)$ and the rotor angle, $\theta$. Values of each phase current are summed with the negative of the output of the inverse current model 330, $(\hat{i}_1, \hat{i}_2, \hat{i}_3)$, in a comparator 332 to produce an error signal $\epsilon i_n$. The output of the inverse current model 330 is derived from the value of the three observer fluxes $(\hat{\psi}_1, \hat{\psi}_2, \hat{\psi}_3)$ and rotor angle $(\theta)$.

This embodiment uses the inverse of the flux-linkage current model that was described earlier in conjunction with FIGS. 14 and 15. The inverse current model is needed (phase current estimate as a function of the phase flux or flux linkages and rotor angle) because the measured phase currents are compared with the estimated phase currents as shown in FIG. 16. In this form the observer is in the classic Luenberger form (see "An Introduction to Observers", Luenberger, D. G., IEEE Translations on Automatic Control, Vol. AC-16, No. 6, December 1971, pp. 596–602, incorporated herein by reference). This flux observer solves the equation:

$$\dot{\hat{\psi}} = V - i(\psi,\theta)R + K_O[i(\psi lklq,\theta) - \hat{i}(\hat{\psi},\theta)]$$

where $\hat{i}$ is calculated from the inverse flux linkage. $\dot{\hat{\psi}}, \hat{\psi}, \psi, i, V$ are all nx1 vectors where n is the number of motor phases. The current model observer gain $K_O$ is based on a nxn matrix for an n-phase machine.

From the derivation (not shown) of the observer gain matrix it can be shown that:

$$K_O(\theta, \omega, i_1, i_2, i_3) = -R_n - K(\omega) f(i_1, i_2, i_3, \theta)$$

In matrix form:

$$K_o = -\begin{bmatrix} R_n & 0 & 0 \\ 0 & R_n & 0 \\ 0 & 0 & R_n \end{bmatrix} - K(\omega) \begin{bmatrix} f_1(i_1,\theta) & 0 & 0 \\ 0 & f_2(i_2,\theta) & 0 \\ 0 & 0 & f_3(i_3,\theta) \end{bmatrix}$$

ignoring mutual inductance. More generally, in the linear magnetic case where mutual inductance is included:

$$K_o = -\begin{bmatrix} R_n & 0 & 0 \\ 0 & R_n & 0 \\ 0 & 0 & R_n \end{bmatrix} - K(\omega) \begin{bmatrix} f_{11}(\theta) & \mu_{12}(\theta) & \mu_{13}(\theta) \\ \mu_{21}(\theta) & f_{22}(\theta) & \mu_{23}(\theta) \\ \mu_{31}(\theta) & \mu_{32}(\theta) & f_{33}(\theta) \end{bmatrix} \begin{bmatrix} i_1 \\ i_2 \\ i_3 \end{bmatrix}$$

Two other general, non-linear, cases can be similarly defined:

$$K_o = -\begin{bmatrix} R_n & 0 & 0 \\ 0 & R_n & 0 \\ 0 & 0 & R_n \end{bmatrix} - K(\omega) \begin{bmatrix} f_{11}(i_1,\theta) + \mu_{123}(i_1,i_2,i_3,\theta) \\ f_{22}(i_2,\theta) + \mu_{213}(i_1,i_2,i_3,\theta) \\ f_{33}(i_3,\theta) + \mu_{312}(i_1,i_2,i_3,\theta) \end{bmatrix}$$

$$K_o = -\begin{bmatrix} R_n & 0 & 0 \\ 0 & R_n & 0 \\ 0 & 0 & R_n \end{bmatrix} - K(\omega) \begin{bmatrix} \hat{\psi}_a \frac{(i_1,i_2,i_3,\theta)}{i_1} \\ \hat{\psi}_b \frac{(i_1,i_2,i_3,\theta)}{i_2} \\ \hat{\psi}_c \frac{(i_1,i_2,i_3,\theta)}{i_3} \end{bmatrix}$$

In these expressions mutual inductance is included. It will be appreciated that the form of the expression depends on how the total flux model is defined. The $K(\omega)$ function has a frequency response that is typically similar to that in FIG. 17, such that the $K(\omega)$ function dominates at zero and low speeds, but the voltage model dominates with increasing speed. Typically, the response of the current estimator will begin to tail off at about 10% to 20% of base speed, i.e. the highest speed of maximum torque output of the machine.

Certain embodiments of the invention provide a flux control technique for electronically switched brushless machines of various types, but particularly switched reluctance machines. It produces a real-time signal estimate of the flux in the magnetic circuit of the machine to which a reference value of flux can be compared to control the machine output. Preferred embodiments take account of the differing considerations at high and low speeds by using a current model and a voltage model of the machine flux according to machine speed.

It will be apparent to the skilled person that various modifications and changes can be made to the specifically disclosed embodiments without departing from the invention. It also will be apparent that features and advantages described with respect to one particular disclosed embodiment generally apply equally to the other disclosed embodiments. For example, features and advantages described with respect to FIGS. 4–10 also apply to FIGS. 11–17, and vice versa. Similarly, the systems and methods of FIGS. 4–10 are usable with those of FIGS. 11–17, and vice versa. The invention is to be limited only by the spirit and scope of the following claims.

What is claimed is:

1. A flux control system, comprising:
   a flux controller adapted to receive a flux command as an input and to provide a phase coil energization signal as an output;
   an electromagnetic system adapted to receive the phase coil energization signal, the electromagnetic system comprising a plurality of phase coils, wherein the phase coil energization signal is in the form of an energization vector that includes separate energization signals for each of the phase coils; and a flux observer adapted to provide a feedback signal to the flux controller, the feedback signal corresponding to flux in the electromagnetic system;

wherein the phase coil energization signal provided by the flux controller energizes the electromagnetic system such that flux in the electromagnetic system follows the flux command.

2. A flux control system as claimed in claim 1, wherein the electromagnetic system comprises an electromagnetic actuator.

3. A flux control system as claimed in claim 1, wherein the flux observer comprises a Hall-effect probe.

4. A flux control system as claimed in claim 3, wherein the Hall-effect probe is a thin-film Hall-effect device.

5. A flux control system as claimed in claim 1, wherein the flux observer comprises a Gauss meter.

6. An electrical drive system comprising:

an electrical machine having a rotor, a stator and at least one phase winding arranged to establish flux in a magnetic circuit in the machine;

an observer adapted to produce a feedback signal proportional to flux-causing voltage across the or each phase winding, wherein the observer is part of a flux estimator adapted to produce a flux signal proportional to the flux in the or each phase winding from the feedback signal; and a flux controller having an input signal representing demanded output of the machine, which controller is responsive to the input signal and the feedback signal to produce control signals for actuating at least one switch to control the flux in the at least one phase winding.

7. A system as claimed in claim 6 in which the observer includes a transducer operably coupled with the or each phase winding.

8. A system as claimed in claim 6 in which the observer includes a search coil.

9. A system as claimed in claim 6 in which the observer is operably coupled with a voltage model of the machine for producing the feedback signal.

10. A system as claimed in claim 6 in which the estimator includes a current model of the machine arranged to receive signals representing phase current and rotor position and being operable to produce a flux estimate for the or each phase winding therefrom.

11. A system as claimed in claim 10 in which the estimator includes at least one comparator for producing a current model error signal from the flux estimate and the feedback signal.

12. A system as claimed in claim 10 in which the observer is operably coupled with a voltage model of the machine for producing the feedback signal, further in which the estimator further includes at least one adder for summing output of the voltage model and differentiated output of the current model to produce the feedback signal.

13. A system as claimed in claim 10 in which the estimator includes a current model controller arranged to apply a control law function to output of the current model, the current model controller having a response to machine speed such that a current model output signal is increasingly attenuated with increasing machine speed above a predetermined machine speed.

14. A system as claimed in claim 10 in which the observer is operably coupled with a voltage model of the machine for producing the feedback signal, the system further being adapted to cause output of the current model to dominate output of the voltage model at relatively low machine speeds, and to cause output of the voltage model to dominate output of the current model at relatively high machine speeds.

15. A system as claimed in claim 6 in which the electrical machine is a switched reluctance machine.

16. A method of controlling an electrical machine having a rotor, a stator and at least one phase winding, the method comprising:

arranging a transducer in a magnetic circuit of the machine to produce a flux signal indicative of the flux in the at least one phase winding;

producing an input signal representing a demanded output of the machine; and controlling energization of the at least one phase winding in response to the input signal and the flux signal.

17. A method as claimed in claim 16 wherein the machine is a switched reluctance machine.

* * * * *

UNITED STATES PATENT AND TRADEMARK OFFICE
CERTIFICATE OF CORRECTION

PATENT NO. : 6,731,083 B2
DATED : May 4, 2004
INVENTOR(S) : Joseph Gerald Marcinkiewicz It is certified that error appears in the above-identified patent and that said Letters Patent is hereby corrected as shown below:

Title page,
Item [73], Assignee, has been changed from "Switched Reluctance Drives, Ltd., Harrogate (GB)" to -- Emmerson Electric Co., St. Louis, Missouri --

Signed and Sealed this

Twelfth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,731,083 B2
DATED : May 4, 2004
INVENTOR(S) : Joseph Gerald Marcinkiewicz It is certified that error appears in the above-identified patent and that said Letters Patent is hereby corrected as shown below:

<u>Title page,</u>
Item [73], Assignee, has been changed from "Switched Reluctance Drives, Ltd., Harrogate (GB)" to -- Emerson Electric Co., St. Louis, Missouri --

This certificate supersedes Certificate of Correction issued October 12, 2004.

Signed and Sealed this

Fifth Day of April, 2005

JON W. DUDAS
*Director of the United States Patent and Trademark Office*